United States Patent
Takuno et al.

(10) Patent No.: US 8,734,283 B2
(45) Date of Patent: *May 27, 2014

(54) SPEED REDUCTION MECHANISM, AND MOTOR TORQUE TRANSMISSION DEVICE INCLUDING THE SAME

(71) Applicant: JTEKT Corporation, Osaka (JP)

(72) Inventors: Hiroshi Takuno, Nukata-gun (JP); Kunihiko Suzuki, Gamagori (JP); Keita Nomura, Kariya (JP); Tsune Kobayashi, Okazaki (JP); Tohru Onozaki, Nagoya (JP); Masaharu Tagami, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,534

(22) Filed: Jan. 2, 2013

(65) Prior Publication Data

US 2013/0178319 A1      Jul. 11, 2013

(30) Foreign Application Priority Data

Jan. 11, 2012 (JP) ................................. 2012-003166
Mar. 6, 2012 (JP) ................................. 2012-049239
Mar. 6, 2012 (JP) ................................. 2012-049240
Nov. 14, 2012 (JP) ................................. 2012-250087

(51) Int. Cl.
    *F16H 1/32*      (2006.01)

(52) U.S. Cl.
    USPC ............................. 475/177; 475/162; 475/171

(58) Field of Classification Search
    USPC .................. 475/162, 168, 171, 174, 176, 177
    See application file for complete search history.

(56) References Cited

U.S. PATENT DOCUMENTS

| 5,030,184 A | * | 7/1991 | Rennerfelt | .................... 475/162 |
| 2011/0082000 A1 | | 4/2011 | Makino | |

(Continued)

FOREIGN PATENT DOCUMENTS

| EP | 2 180 209 A1 | 4/2010 |
| EP | 2 292 946 A1 | 3/2011 |

(Continued)

OTHER PUBLICATIONS

Extended European Search Report issued May 7, 2013 in Patent Application No. 13150486.2.
U.S. Appl. No. 13/692,130, filed Dec. 3, 2012, Suzuki, et al.
U.S. Appl. No. 13/732,523, filed Jan. 2, 2013, Takuno, et al.

*Primary Examiner* — Justin Holmes
(74) *Attorney, Agent, or Firm* — Oblon, Spivak, McClelland, Maier & Neustadt, L.L.P.

(57) ABSTRACT

When a bearing includes outer and inner rings and the outer ring is fitted to the inner periphery of an input member, which defines a center hole, with a clearance and the inner ring is fitted to an eccentric portion with a clearance, a size between a second axis and a third axis is set to a size that is smaller than or equal to half of a size obtained by adding a diameter difference between an outside diameter of the bearing and an inside diameter of the input member, which defines the center hole, a diameter difference between an inside diameter of the bearing and an outside diameter of the eccentric portion and an operating clearance of the bearing in a state where the input member has been moved to contact the housing on a line perpendicular to the second axis and a fourth axis.

20 Claims, 15 Drawing Sheets

(56) References Cited

U.S. PATENT DOCUMENTS

| | | |
|---|---|---|
| 2011/0133541 A1 | 6/2011 | Makino et al. |
| 2012/0329596 A1* | 12/2012 | Nomura et al. ............... 475/149 |
| 2012/0329597 A1* | 12/2012 | Nomura et al. ............... 475/150 |
| 2013/0057117 A1 | 3/2013 | Suzuki et al. |
| 2013/0065722 A1* | 3/2013 | Nomura et al. ............... 475/150 |
| 2013/0143707 A1* | 6/2013 | Suzuki et al. ............... 475/149 |

FOREIGN PATENT DOCUMENTS

| | | |
|---|---|---|
| JP | 10-51999 A | 2/1998 |
| JP | 2007-218407 | 8/2007 |
| WO | WO 2011/145502 A1 | 11/2011 |

* cited by examiner

SPEED REDUCTION MECHANISM, AND MOTOR TORQUE TRANSMISSION DEVICE INCLUDING THE SAME

INCORPORATION BY REFERENCE

The disclosure of Japanese Patent Application Nos. 2012-049239 filed on Mar. 6, 2012 and 2012-250087 filed on Nov. 14, 2012 including the specification, drawings and abstract, is incorporated herein by reference in its entirety.

BACKGROUND OF THE INVENTION

1. Field of the Invention

The invention relates to a speed reduction mechanism that is suitably used in, for example, an electric vehicle that has an electric motor as a driving source and a motor torque transmission device that includes the speed reduction mechanism.

2. Description of Related Art

There is a conventional motor torque transmission device that is mounted in an automobile, and that includes an electric motor and a reduction-transmission mechanism (see, for example, Japanese Patent Application Publication No. 2007-218407 (JP 2007-218407 A)). The electric motor generates motor torque. The reduction-transmission mechanism reduces the speed of rotation output from the electric motor and transmits driving force to a differential mechanism.

The reduction-transmission mechanism of the motor torque transmission device of this type has a pair of disc-shaped revolving members formed of curved plates, a plurality of outer pins, and a plurality of inner pins. The revolving members each are an example of an external gear mechanism that revolves in accordance with the rotation of a motor shaft of the electric motor, the motor shaft having eccentric portions. The revolving members each have a plurality of wave-shaped portions at its outer peripheral portion. The wave-shaped portions are formed of a trochoidal curve, such as an epitrochoidal curve. The outer pins are an example of an internal gear mechanism that applies rotation force to the revolving members. The inner pins are arranged radially inward of the outer pins, and output the rotation force of the revolving members to the differential mechanism as driving force (torque), and the driving force is transmitted to a rotation member at wheel side.

The revolving members each have a center hole and a plurality of pin insertion holes that are arranged at equal intervals around the central axis of the center hole. The central axis of each center hole is offset from the axis of each eccentric portion of the motor shaft. The revolving members are rotatably supported by the respective eccentric portions of the motor shaft via bearings (cam bearings).

The outer pins are arranged around the axis of the motor shaft at equal intervals, and are connected to a housing of the reduction-transmission mechanism.

The inner pins are passed through the pin insertion holes of the revolving members. The inner pins are fitted to a differential case. Bearings (pin-side bearings) are fitted to the inner pins. The bearings are used to reduce contact resistance between the inner pins and the inner peripheries which define the pin insertion holes of the revolving members.

In the motor torque transmission device described in JP 2007-218407 A, a plurality of outer pins needs to be prepared, and further, the outer peripheral portions of the revolving members need to be formed into a complex shape, which is uneconomical.

To avoid such a problem, external gears, each of which is an example of an external gear mechanism, may be employed as revolving members, an internal gear, which is an example of an internal gear mechanism, may be employed as a rotation force applying member that applies rotation force to the revolving members. In addition, the number of teeth of the internal gear may be set larger than the number of teeth of each of the external gears.

However, when a reduction-transmission mechanism formed of an external gear mechanism and an internal gear mechanism, such as the reduction-transmission mechanism formed of the outer pins and the disc-shaped curved plates each having the wave-shaped portions formed of a trochoidal curve, such as an epitrochoidal curve, at its outer peripheral portion, as described in JP 2007-218407 A, or the reduction-transmission mechanism formed of the external gears and the internal gear, is used in a motor torque transmission device for an automobile, the revolving speed of the external gear mechanism that is a revolving member becomes relatively high. Therefore, a load due to centrifugal force acts on the cam bearings from the revolving members when the torque is output. As a result, it is necessary to use bearings with high durability as the cam-side bearings, resulting in a cost increase. In addition, because a load due to centrifugal force acts on the cam-side bearings, the service life of each of the cam-side bearings is shortened.

SUMMARY OF THE INVENTION

It is an object of the invention to provide a speed reduction mechanism with which the service life of bearings is extended, and a motor torque transmission device that includes the speed reduction mechanism.

An aspect of the invention relates to a speed reduction mechanism, including: a rotary shaft that rotates around a first axis, and that has an eccentric portion of which a central axis is a second axis that is offset from the first axis; an input member that is arranged radially outward of the rotary shaft, and that is formed of an external gear mechanism having a center hole of which a central axis is a third axis and a plurality of through-holes arranged at equal intervals around the third axis and having a pitch circle of which a central axis coincides with the third axis, and provided with a bearing interposed between an inner periphery of the input member, which defines the center hole, and an outer periphery of the eccentric portion; a cylindrical housing that has a rotation force applying member formed of an internal gear mechanism that is arranged so as to be fitted to the input member in a radial direction of the input member, that is in mesh with the input member, that has teeth the number of which is larger than the number of teeth of the external gear mechanism, and that has a pitch circle of which a central axis is a fourth axis; and output members that receive rotation force applied to the input member by the rotation force applying member of the housing and output the rotation force, and that are passed through the respective through-holes. When the bearing includes an outer ring and an inner ring and the outer ring is fitted to the inner periphery of the input member, which defines the center hole, with a clearance in a radial direction of the rotary shaft and the inner ring is fitted to the eccentric portion with a clearance in the radial direction of the rotary shaft, a size between the second axis and the third axis is set to a size that is smaller than or equal to half of a size obtained by adding a diameter difference between an outside diameter of the bearing and an inside diameter of the input member, which defines the center hole, a diameter difference between an inside diameter of the bearing and an outside diameter of the eccentric portion and an operating clearance of a radial internal clearance of the bearing in a state where the input member has been moved to contact the housing on a line perpendicular to the second axis and the fourth axis.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5A and FIG. 5B are views that show a state where input members are in contact with a rotation force applying member of the reduction-transmission mechanism of the motor torque transmission device according to the first embodiment of the invention, wherein FIG. 5A shows the front view and FIG. 5B shows the sectional view;

DETAILED DESCRIPTION OF EMBODIMENTS

Hereinafter, a motor torque transmission device according to a first embodiment of the invention will be described in detail with reference to the accompanying drawings.

Figure 1:
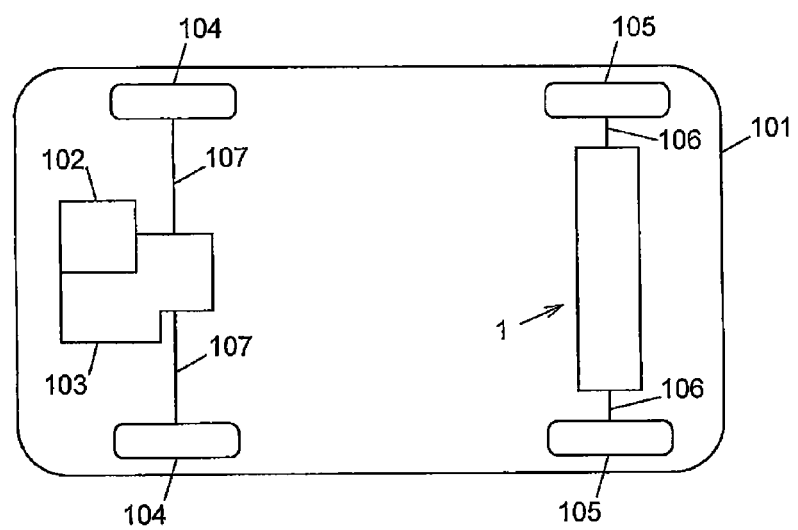
FIG. 1 is a schematic plan view for illustrating a vehicle in which a motor torque transmission device according to a first embodiment of the invention is mounted.

FIG. 1 schematically shows a four-wheel drive vehicle 101. As shown in FIG. 1, the four-wheel drive vehicle 101 includes a front wheel power system and a rear wheel power system, and includes a motor torque transmission device 1, an engine 102, a transaxle 103, a pair of front wheels 104 and a pair of rear wheels 105. The front wheel power system uses the engine as a driving source. The rear wheel power system uses an electric motor 4 (described later) as a driving source.

The motor torque transmission device 1 is arranged in the rear wheel power system of the four-wheel drive vehicle 101, and is supported by a vehicle body (not shown) of the four-wheel drive vehicle 101.

Figure 2:
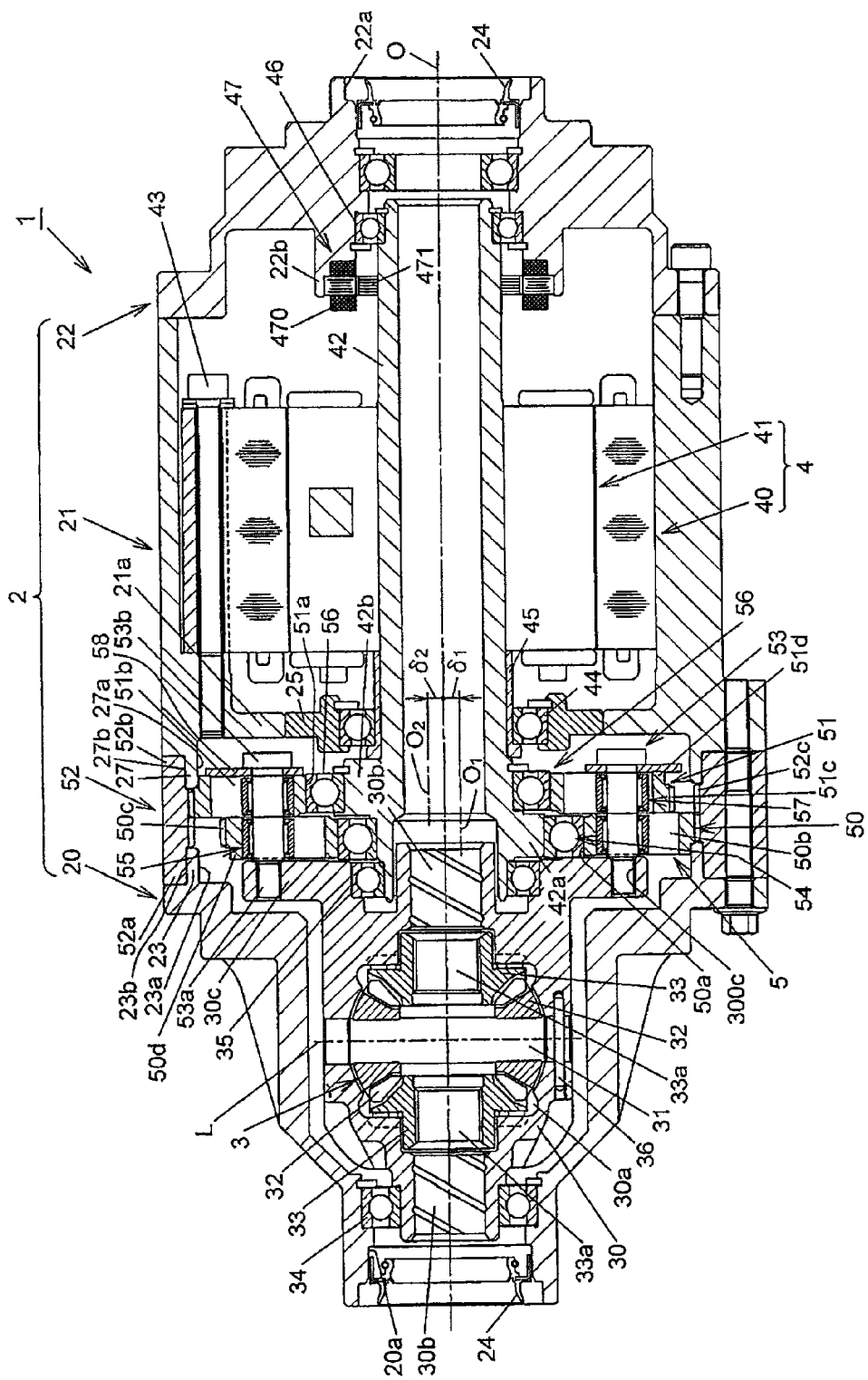
FIG. 2 is a sectional view for illustrating the motor torque transmission device according to the first embodiment of the invention.

The motor torque transmission device 1 transmits driving force based on the motor torque of the electric motor 4 to the rear wheels 105. Thus, the motor torque of the electric motor 4 is output to rear axle shafts 106 via a reduction-transmission mechanism 5 and a rear differential 3 (both are shown in FIG. 2) to drive the rear wheels 105. The details of the motor torque transmission device 1, and the like, will be described later.

The engine 102 is arranged in the front wheel power system of the four-wheel drive vehicle 101. Thus, the driving force of the engine 102 is output to front axle shafts 107 via the transaxle 103 to drive the front wheels 104.

FIG. 2 is an overall view of the motor torque transmission device. As shown in FIG. 2, the motor torque transmission device 1 is formed mainly of a housing 2, the rear differential 3, the electric motor 4 and the reduction-transmission mechanism 5. The central axis of the housing 2 is an axis (a rotation axis O) of each rear axle shaft 106 (shown in FIG. 1). The rear differential 3 distributes driving force to the rear wheels 105 (shown in FIG. 1). The electric motor 4 generates motor torque to actuate the rear differential 3. The reduction-transmission mechanism 5 reduces the speed of rotation output from the electric motor 4 and transmits driving force to the rear differential 3.

The housing 2 has a rotation force applying member 52 (described later), a first housing element 20, a second housing element 21 and a third housing element 22. The housing 2 is arranged on the vehicle body. The first housing element 20 accommodates the rear differential 3. The second housing element 21 accommodates the electric motor 4. The third housing element 22 closes a first opening portion of the second housing element 21 (an opening portion on the opposite side of the second housing element 21 from a first housing element 20-side opening portion (second opening portion)).

The first housing element 20 is arranged at a second side (left side in FIG. 2) of the housing 2. The entirety of the first housing element 20 is formed of a stepped closed-end cylindrical member that is open toward the second housing element 21. The bottom of the first housing element 20 has a shaft insertion hole 20a through which one of the rear axle shafts 106 (shown in FIG. 1) is passed. An annular protrusion (second protrusion) 23 that protrudes toward the second housing element 21 along a fourth axis (rotation axis O in the present embodiment) is formed integrally on the open end face of the first housing element 20. An inner periphery (fitting face to which the input member 50 is fitted) 23a of the protrusion 23 has a larger inside diameter than the maximum inside diameter of the first housing element 20, and is formed of a peripheral face of which the central axis coincides with the rotation axis O. An outer periphery 23b of the protrusion 23 has an outside diameter smaller than the maximum outside diameter of the first housing element 20, and is formed of a cylindrical surface of which the central axis coincides with the rotation axis O. A seal member 24 is interposed between the inner periphery of the first housing element 20 and the outer periphery of the rear axle shaft 106. The seal member 24 seals the shaft insertion hole 20a.

The second housing element 21 is arranged at the middle of the housing 2 in the axial direction. The entirety of the second housing element 21 is formed of an open-end cylindrical member that is open toward both sides in the direction of the fourth axis (rotation axis O). A stepped inward flange 21a, which is interposed between the electric motor 4 and the reduction-transmission mechanism 5, is formed integrally with the second opening portion of the second housing element 21 (the opening portion on the first housing element 20-side). An annular member 25, to which a race is fitted, is fitted to the inner periphery of the inward flange 21a. An annular protrusion (second protrusion) 27, which protrudes toward the first housing element 20 along the rotation axis O, is formed integrally on the second open end face of the second housing element 21 (the open end face on the first housing element 20-side). An inner periphery (fitting face to which the input member 51 is fitted) 27b of the protrusion 27 has substantially the same inside diameter as the maximum inside diameter of the second housing element 21, and is formed of a peripheral face of which the central axis coincides with the rotation axis O. The outer periphery 27b of the protrusion 27 has an outside diameter smaller than the outside diameter of the second housing element 21 and substantially the same as the outside diameter of the protrusion 23, and is formed of a peripheral face of which the central axis coincides with the rotation axis O.

The third housing element 22 is arranged at the first side (right side in FIG. 2) of the housing 2. The entirety of the third housing element 22 is formed of a stepped closed-end cylindrical member that is open toward the second housing element 21. The bottom of the third housing element 22 has a shaft insertion hole 22a through which the other one of the rear axle shafts 106 is passed. A cylindrical portion 22b, which protrudes toward the electric motor 4 and to which a stator is fitted, is formed integrally with the third housing element 22 so as to surround the inner opening of the shaft insertion hole 22a. A seal member 24 that seals the shaft insertion hole 22a is interposed between the inner periphery of the third housing element 22 and the outer periphery of the rear axle shaft 106.

The rear differential 3 is formed of a differential case 30, a pinion gear shaft 31, and a bevel gear differential mechanism that includes a pair of pinion gears 32 and a pair of side gears 33. The rear differential 3 is arranged at the second side of the motor torque transmission device 1.

With this configuration, the torque of the differential case 30 is distributed from the pinion gear shaft 31 to the side gears 33 via the pinion gears 32. The torque of the differential case 30 is further transmitted from the side gears 33 to the right and left rear wheels 105 (shown in FIG. 1) via the rear axle shafts 106 (shown in FIG. 1).

When there arises a difference in driving resistance between the right and left rear wheels 105, the torque of the differential case 30 is differentially distributed to the right and left rear wheels 105 by the rotations of the pinion gears 32.

The differential case 30 is arranged on the rotation axis O. The differential case 30 is rotatably supported by the first housing element 20 via a ball bearing 34, and is rotatably supported by a motor shaft (rotary shaft) 42 of the electric motor 4 via a ball bearing 35. The differential case 30 rotates upon reception of driving force based on the motor torque of the electric motor 4 from the reduction-transmission mechanism 5.

The differential case 30 has an accommodation space 30a and a pair of shaft insertion holes 30b. A differential mechanism unit (the pinion gear shaft 31, the pinion gears 32 and the side gears 33) is accommodated in the accommodation space 30a. The shaft insertion holes 30b communicate with the accommodation space 30a, and the right and left rear axle shafts 106 are passed through the shaft insertion holes 30b.

An annular flange 30c that faces the reduction-transmission mechanism 5 is formed integrally with the differential case 30. The flange 30c has a plurality of (six in the present embodiment) pin fitting holes 300c that are arranged at equal intervals around the axis of the differential case 30.

The pinion gear shaft 31 is arranged along an axis L that is perpendicular to the axis of the differential case 30 in the accommodation space 30a of the differential case 30. The rotation of the pinion gear shaft 31 about the axis L and the movement of the pinion gear shaft 31 in the direction of the axis L are restricted by a pin 36.

The pinion gears 32 are rotatably supported by the pinion gear shaft 31, and are accommodated in the accommodation space 30a of the differential case 30.

The side gears 33 each have a shaft coupling hole 33a. The side gears 33 are accommodated in the accommodation space 30a of the differential case 30. Each of the shaft coupling holes 33a is coupled to a corresponding one of the right and left rear axle shafts 106 (shown in FIG. 1) by spline fitting. The side gears 33 are configured such that the gear axes are perpendicular to the gear axes of the pinion gears 32 and the side gears 33 are in mesh with the pinion gears 32.

The electric motor 4 includes a stator 40, a rotor 41 and the motor shaft 42. The electric motor 4 is coupled to the rear differential 3 via the reduction-transmission mechanism 5 on the rotation axis O. The stator 40 of the electric motor 4 is connected to an electronic control unit (ECU) (not shown). The electric motor 4 is configured such that the stator 40 receives a control signal from the ECU, motor torque for driving the rear differential 3 is generated with the use to the stator 40 and the rotor 41, and the rotor 41 is rotated together with the motor shaft 42.

The stator 40 is arranged at the outer peripheral side of the electric motor 4, and is fitted to the inward flange 21a of the second housing element 21 with a fitting bolt 43.

The rotor 41 is arranged at the inner peripheral side of the electric motor 4, and is fitted to the outer periphery of the motor shaft 42.

The motor shaft 42 is arranged on the rotation axis O. In addition, the second end portion of the motor shaft 42 is rotatably supported by the inner periphery of the annular member 25 via a ball bearing 44 and a sleeve 45, and the first end portion of the motor shaft 42 is rotatably supported by the inner periphery of the third housing element 22 via a ball bearing 46. The entirety of the motor shaft 42 is formed of a cylindrical shaft member through which the rear axle shafts 106 (shown in FIG. 1) are passed.

An eccentric portion 42a and an eccentric portion 42b, both of which are circular in planar view, are formed integrally with the second end portion of the motor shaft 42. The central axis of the eccentric portion 42a is an axis $O_1$ (second axis) that is offset from the rotation axis O (first axis) of the motor shaft 42 by an eccentric amount $\delta_1$. The central axis of the eccentric portion 42b is an axis (second axis) $O_2$ that is offset from the rotation axis O by an eccentric amount $\delta_2$ ($\delta_1=\delta_2=\delta$). The eccentric portion 42a and the eccentric portion 42b are arranged so as to be next to each other along the rotation axis O and apart from each other in the circumferential direction around the rotation axis O at equal intervals (180°). That is, the eccentric portion 42a and the eccentric portion 42b are arranged on the outer periphery of the motor shaft 42 such that the distance from the axis $O_1$ to the rotation axis O and the distance from the axis $O_2$ to the rotation axis O are equal to each other and the distance between the axis $O_1$ and the axis $O_2$ in one of the circumferential directions around the rotation axis O and the distance between the axis $O_1$ and the axis $O_2$ in the other circumferential direction around the rotation axis O are equal to each other.

A resolver 47 is arranged at the first end portion of the motor shaft 42. The resolver 47 serves as a rotation angle detector, and is interposed between the outer periphery of the motor shaft 42 and the inner periphery of the cylindrical portion 22b. The resolver 47 has a stator 470 and a rotor 471, and is accommodated inside the third housing element 22. The stator 470 is fitted to the inner periphery of the cylindrical portion 22b. The rotor 471 is fitted to the outer periphery of the motor shaft 42.

Figure 3:
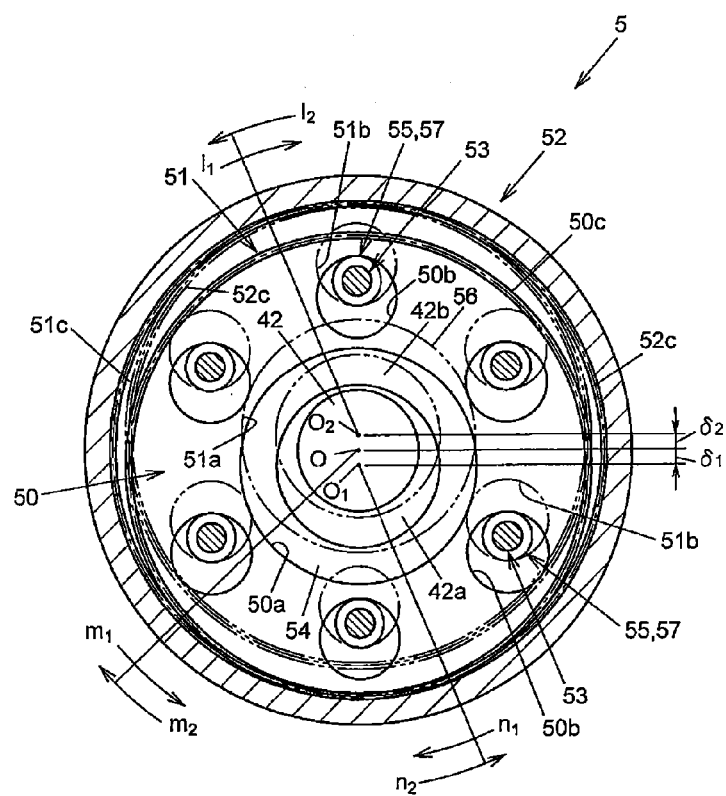
FIG. 3 is a schematic sectional view for illustrating a reduction-transmission mechanism of the motor torque transmission device according to the first embodiment of the invention.
Figure 4:
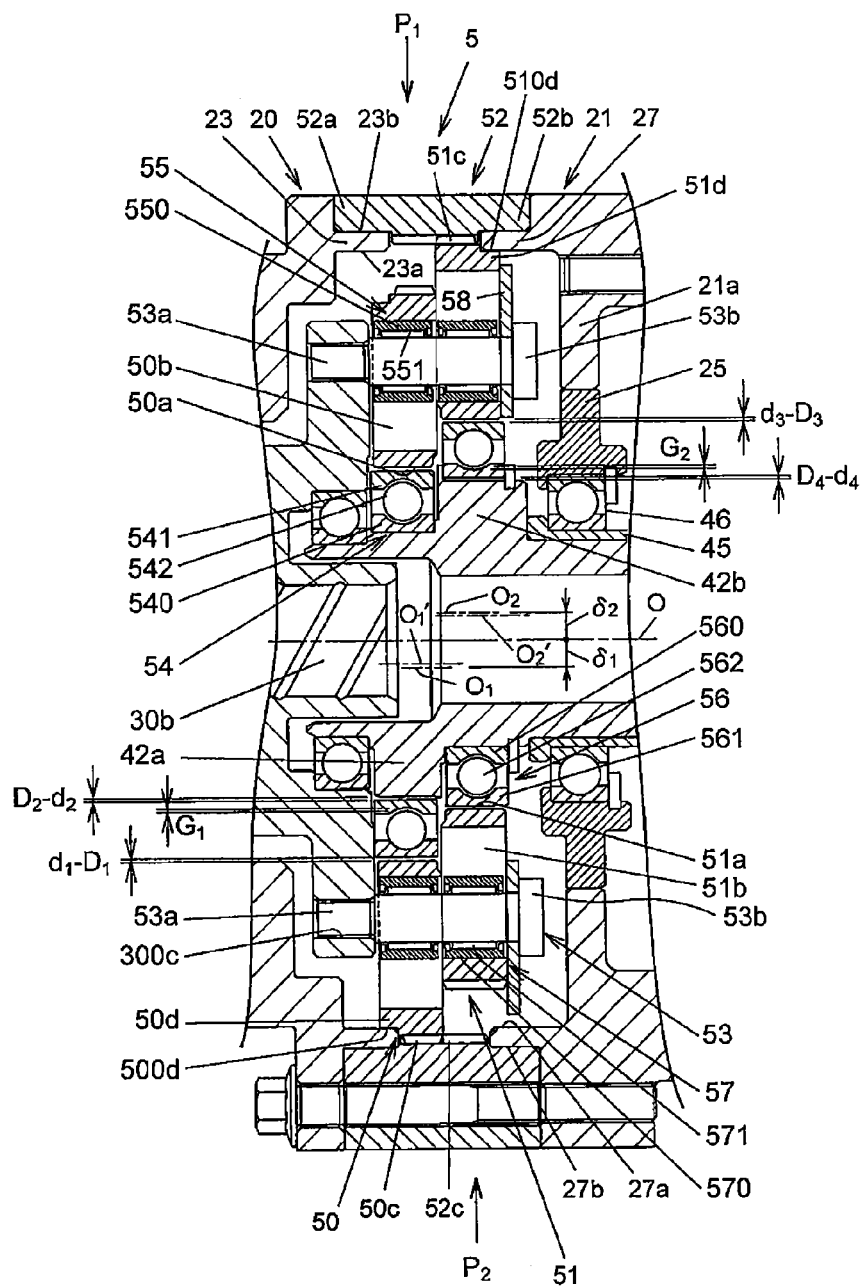
FIG. 4 is a schematic sectional view for illustrating main portions of the reduction-transmission mechanism of the motor torque transmission device according to the first embodiment of the invention.
Figures 5A, 5B:
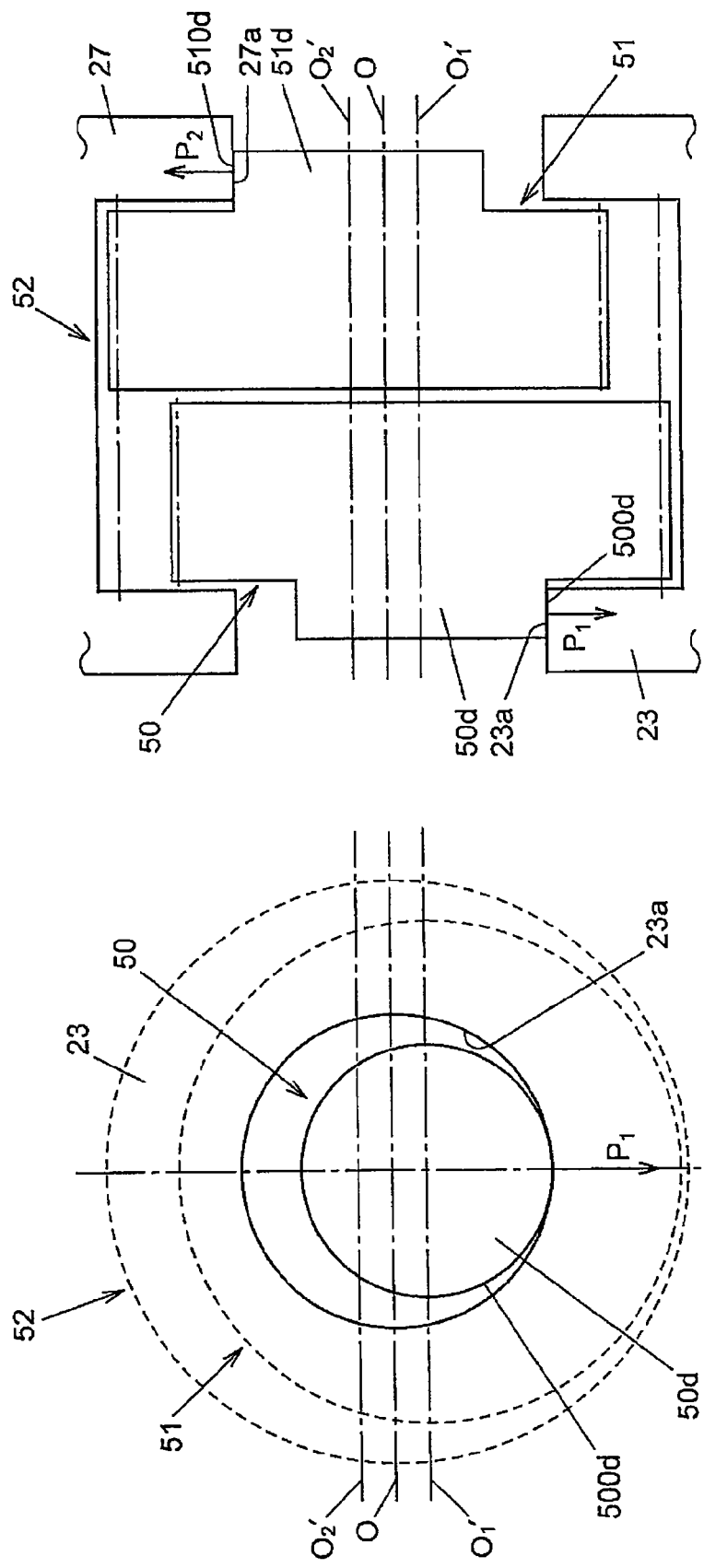
Figure 6:
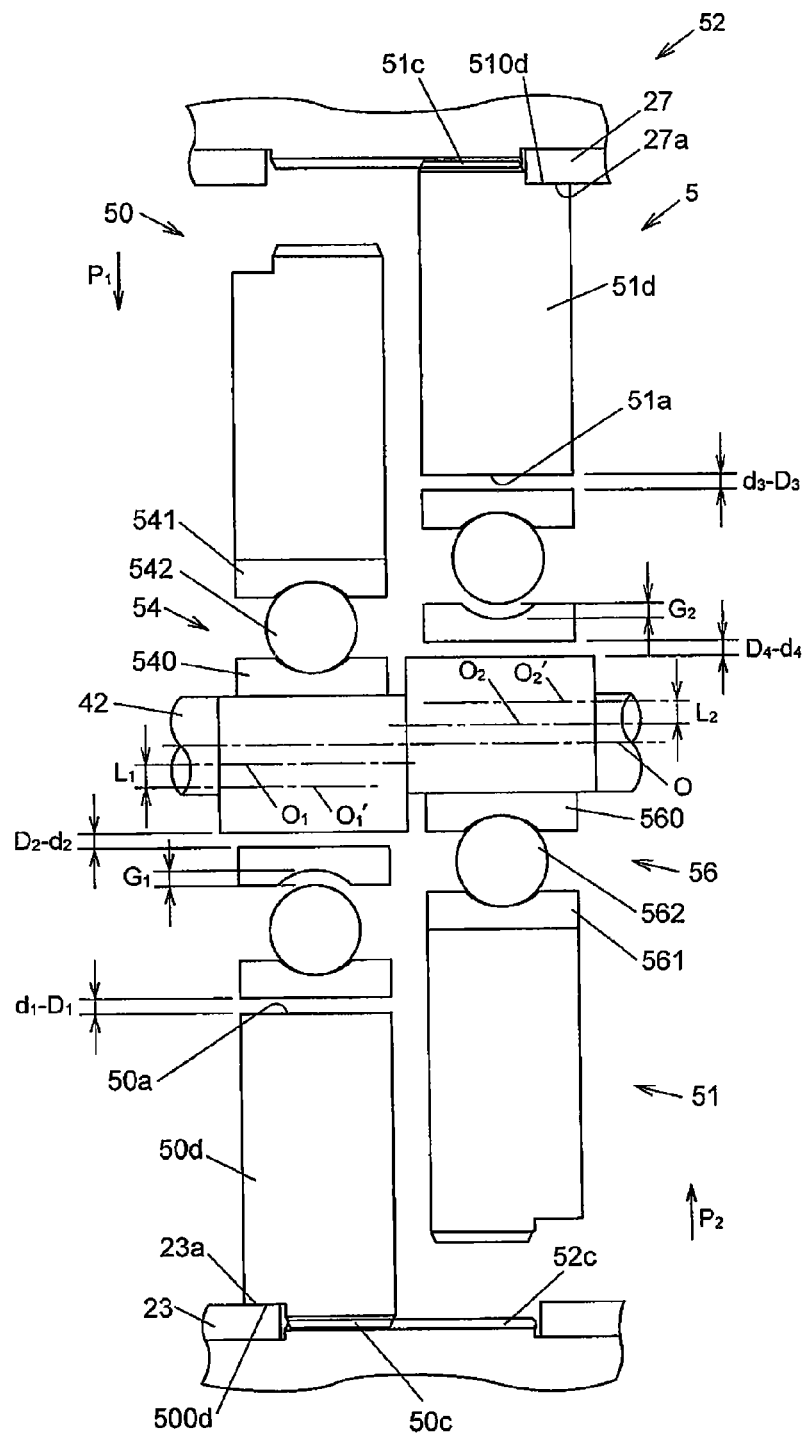
FIG. 6 is a simplified sectional view that shows a state where the input members of the reduction-transmission mechanism are supported in the motor torque transmission device according to the first embodiment of the invention.

FIG. 3 shows the reduction-transmission mechanism. FIG. 4 shows a clearance between each input member and a corresponding first bearing. FIG. 5A and FIG. 5B shows a state where the input members are in contact with the rotation force applying member. FIG. 6 shows a state where the input members are supported. As shown in FIG. 3 and FIG. 4, the reduction-transmission mechanism 5 has a pair of input members 50, 51, the rotation force applying member 52 and a plurality of output members 53. The reduction-transmission mechanism 5 is interposed between the rear differential 3 and the electric motor 4 (both are shown in FIG. 2). As described above, the reduction-transmission mechanism 5 reduces the speed of rotation output from the electric motor 4 and then transmits the driving force to the rear differential 3.

As shown in FIG. 4 and FIG. 6, the input member 50 is formed of an external gear that has a center hole 50a of which the central axis coincides with an axis (third axis) $O_{1'}$. The input member 50 is arranged so as to be closer to the rear differential 3 than the input member 51. In addition, the input member 50 is rotatably supported by the motor shaft 42 via a ball bearing 54. The ball bearing 54 may function as a first bearing, and is interposed between the inner periphery of the input member 50, which defines the center hole 50a, and the eccentric portion 42a. The input member 50 is configured to make circular motion (revolving motion about the rotation axis O) in the directions of the arrows $m_1$, $m_2$ (shown in FIG. 3) with the eccentric amount $\delta$, upon reception of motor torque from the electric motor 4. The ball bearing 54 includes two races (an inner ring 540 and an outer ring 541) and rolling elements 542. The inner ring 540 is arranged radially inward of the outer ring 541. The rolling elements 542 roll between the inner ring 540 and the outer ring 541. The inner ring 540 is fitted to the eccentric portion 42a with a clearance (gap) in the radial direction of the motor shaft 42. The outer ring 541 is fitted to the inner periphery of the input member 50, which defines the center hole 50a, with a clearance (gap) in the radial direction of the motor shaft 42. That is, the inner ring 540 is fitted to the outer periphery of the eccentric portion 42a by clearance fit, and the outer ring 541 is fitted to the inner periphery of the input member 50, which defines the center hole 50a, by clearance fit. Note that FIG. 4 and FIG. 6 show a state where a centrifugal force $P_1$ acts on the input member 50, the inner ring 540, the outer ring 541 and the rolling elements 542.

The input member 50 has a plurality of (six in the present embodiment) pin insertion holes (through-holes) 50b that are arranged at equal intervals around the axis $O_{1'}$. The hole diameter of each pin insertion hole 50b is set to a size that is larger than a size obtained by adding the outside diameter of a needle roller bearing 55, which may function as a second bearing, to the outside diameter of each output member 53. The outside diameter of each needle roller bearing 55 is set to a value that is smaller than the outside diameter of the ball bearing 54. External teeth 50c having an involute tooth profile are formed on the outer periphery of the input member 50.

Among both tooth flanks (both torque transfer faces of each external tooth 50c in the circumferential direction) of each external tooth 50c, the torque transfer face at one side in the circumferential direction functions as a revolving force applying face and a rotation force receiving face with respect to a torque transfer face of one of adjacent two internal teeth 52c of the rotation force applying member 52, and the torque transfer face at the other side in the circumferential direction functions as a revolving force applying face and a rotation force receiving face with respect to a torque transfer face of the other one of the adjacent two internal teeth 52c of the rotation force applying member 52. The number $Z_1$ of the external teeth 50c is set to 195 ($Z_1=195$), for example.

An annular protrusion (first protrusion) 50d is formed on a second end face (end face on the rear differential 3 side) of the input member 50. The protrusion 50d protrudes toward the rear differential 3 along the direction of the third axis $O_{1'}$.

The protrusion 50d is formed at a portion of the input member 50, which has a stiffness higher than that of the remaining portion of the input member 50 (for example, the protrusion 50d is formed at a portion radially inward of the external teeth 50c). An outer periphery 500d (fitting face to which the first housing element 20 is fitted) of the protrusion 50d faces the inner periphery 23a of the protrusion 23 of the first housing element 20, and is formed of a peripheral face of which the central axis coincides with the axis $O_{1'}$.

As shown in FIG. 4 to FIG. 6, in a state where the outer periphery 500d of the protrusion 50d has been brought into contact with the inner periphery 23a of the protrusion 23 of the first housing element 20 due to the movement of the input member 50 on a line perpendicular to the rotation axis O and the axis $O_{1'}$, the outer ring 541 is fitted to the center hole 50a and the inner ring 540 is fitted to the eccentric portion 42a with a clearance in the radial direction of the motor shaft 42. Therefore, a size $L_1$ between the axis $O_1$ and the axis $O_{1'}$ is set to a size that is smaller than or equal to half of the size $\{(d_1-D_1)+(D_2-d_2)+G_1\}$ obtained by adding a diameter difference $d_1-D_1$ between an outside diameter $D_1$ of the ball bearing 54 and an inside diameter $d_1$ of the input member 50, which defines the center hole 50a, a diameter difference $D_2-d_2$ between an inside diameter $D_2$ of the ball bearing 54 and an outside diameter $d_2$ of the eccentric portion 42a, and an operating clearance $G_1$ of a radial internal clearance of the ball bearing 54, that is, $\{(d_1-D_1)+(D_2-d_2)+G_1\}/2 \geq L_1$.

That is, the size $L_1$ is set to such a size that the outer periphery 500d of the protrusion 50d contacts the inner periphery 23a of the protrusion 23 as shown in FIG. 5A and FIG. 5B before the input member 50 moves from its initial state over a distance corresponding to the size that is smaller than or equal to half of the size obtained by adding the diameter difference $d_1-D_1$ between the outside diameter $D_1$ of the ball bearing 54 and the inside diameter $d_1$ of the input member 50, which defines the center hole 50a, the diameter difference $D_2-d_2$ between the inside diameter $D_2$ of the ball bearing 54 and the outside diameter $d_2$ of the eccentric portion 42a, and the operating clearance $G_1$ of the radial internal clearance of the ball bearing 54.

Therefore, as the input member 50 moves in the direction in which the centrifugal force $P_1$ acts, upon reception of a load due to the centrifugal force $P_1$ that is generated on the basis of the circular motion of the input member 50, the outer periphery 500d of the protrusion 50d contacts the inner periphery 23a of the protrusion 23. At the contact position, the first housing element 20 receives a radial load from the input member 50. Thus, the inner periphery 23a of the protrusion 23 of the first housing element 20 intensively receives a load due to the centrifugal force $P_1$ from the input member 50. Therefore, application of the load due to the centrifugal force $P_1$ to the ball bearing 54 (to the points of contact between the outer ring 541 and the rolling elements 542 and the points of contact between the rolling elements 542 and the inner ring 540) is suppressed.

As shown in FIG. 4 and FIG. 6, the input member 51 is formed of an external gear that has a center hole 51a of which the central axis coincides with the axis (third axis) $O_{2'}$. The input member 51 is arranged so as to be closer to the electric motor 4 than the input member 50. In addition, the input member 51 is rotatably supported by the motor shaft 42 via a ball bearing 56. The external gear is an example of the external gear mechanism. The ball bearing 56 may function as a first bearing, and arranged between the inner periphery of the input member 51, which defines the center hole 51a, and the eccentric portion 42b. The input member 51 is configured to make circular motion (revolving motion about the rotation axis O) in the directions of the arrows $m_1$, $m_2$ (shown in FIG. 3) with the eccentric amount δ, upon reception of motor torque from the electric motor 4. The ball bearing 56 includes two races (an inner ring 560 and an outer ring 561) and rolling elements 562. The inner ring 560 is arranged radially inward of the outer ring 561. The rolling elements 562 roll between the inner ring 560 and the outer ring 561. The inner ring 560 is fitted to the eccentric portion 42b with a clearance (gap) in the radial direction of the motor shaft 42. The outer ring 561 is fitted to the inner periphery of the input member 51, which defines the center hole 51a, with a clearance (gap) in the radial direction of the motor shaft 42. That is, the inner ring 560 is fitted to the outer periphery of the eccentric portion 42b by clearance fit, and the outer ring 561 is fitted to the inner periphery of the input member 51, which defines the center hole 51a, by clearance fit. Note that FIG. 4 and FIG. 6 show a state where a centrifugal force $P_2$ acts on the input member 51, the inner ring 560, the outer ring 561 and the rolling elements 562.

The input member 51 has a plurality of (six in the present embodiment) pin insertion holes (through-holes) 51b that are arranged at equal intervals around the axis $O_{2'}$. The hole diameter of each pin insertion hole 51b is set to a size that is larger than a size obtained by adding the outside diameter of a needle roller bearing 57, which may function as a second bearing, to the outside diameter of each output member 53. The outside diameter of each needle roller bearing 57 is set to a size that is smaller than the outside diameter of the ball bearing 56. External teeth 51c having an involute tooth profile are formed on the outer periphery of the input member 51.

Among both tooth flanks (both torque transfer faces of each external tooth 51c in the circumferential direction) of each external tooth 51c, the torque transfer face at one side in the circumferential direction functions as a revolving force applying face and a rotation force receiving face with respect to a torque transfer face of one of adjacent two internal teeth 52c of the rotation force applying member 52, and the torque transfer face at the other side in the circumferential direction functions as a revolving force applying face and a rotation force receiving face with respect to a torque transfer face of the other one of the adjacent two internal teeth 52c of the rotation force applying member 52. The number $Z_2$ of the external teeth 51c is set to 195 ($Z_2$=195), for example.

An annular protrusion (first protrusion) 51d is formed on a first end face (end face on the electric motor 4 side) of the input member 51. The protrusion 51d protrudes toward the electric motor 4 along the direction of the third axis $O_{2'}$.

The protrusion 51d is formed at a portion of the input member 51, which has a stiffness higher than that of the remaining portion of the input member 51 (for example, the protrusion 51d is formed at a portion radially inward of the external teeth 50c). An outer periphery 510d (fitting face to which the second housing element 21 is fitted) of the protrusion 51d faces the inner periphery 27a of the protrusion 27 of the first housing element 21, and is formed of a peripheral face of which the central axis coincides with the axis $O_{2'}$.

As shown in FIG. 4 to FIG. 6, in a state where the outer periphery 510d of the protrusion 51d has been brought into contact with the inner periphery 27a of the protrusion 27 of the second housing element 21 due to the movement of the input member 51 on a line perpendicular to the rotation axis O and the axis $O_{2'}$, the outer ring 561 is fitted to the center hole 51a and the inner ring 560 is fitted to the eccentric portion 42b with a clearance in the radial direction of the motor shaft 42. Therefore, a size $L_2$ between the axis $O_2$ and the axis $O_{2'}$ is set to a size that is smaller than or equal to half of the size $\{(d_3-D_3)+(D_4-d_4)+G_2\}$ obtained by adding a diameter difference $d_3-D_3$ between an outside diameter $D_3$ of the ball bearing 56 and an inside diameter $d_3$ of the input member 51, which defines the center hole 51a, a diameter difference $D_4-d_4$ between an inside diameter $D_4$ of the ball bearing 56 and an outside diameter $d_4$ of the eccentric portion 42b, and an operating clearance $G_2$ of a radial internal clearance of the ball bearing 56, that is, $\{(d_3-D_3)+(D_4-d_4)+G_3\}/2 \geq L_2$.

That is, the size $L_2$ is set to such a size that the outer periphery 510d of the protrusion 51d contacts the inner periphery 27a of the protrusion 27 as shown in FIG. 5A and FIG. 5B before the input member 51 moves from its initial state over a distance corresponding to the size that is smaller than or equal to half of the size obtained by adding the diameter difference $d_3-D_3$ between the outside diameter $D_3$ of the ball bearing 56 and the inside diameter $d_3$ of the input member 51, which defines the center hole 51a, the diameter difference $D_4-d_4$ between the inside diameter $D_4$ of the ball bearing 56 and the outside diameter $d_4$ of the eccentric portion 42b, and the operating clearance $G_2$ of the radial internal clearance of the ball bearing 56.

Therefore, as the input member 51 moves in the direction in which the centrifugal force $P_2$ acts, upon reception of a load due to the centrifugal force $P_2$ that is generated on the basis of the circular motion of the input member 51, the outer periphery 510d of the protrusion 51d contacts the inner periphery 27a of the protrusion 27. At the contact position, the second housing element 21 receives a radial load from the input member 51. Thus, the inner periphery 27a of the protrusion 27 of the second housing element 21 intensively receives a load due to the centrifugal force $P_2$ from the input member 51. Therefore, application of the load due to the centrifugal force $P_2$ to the ball bearing 56 (to the points of contact between the outer ring 561 and the rolling elements 562 and the points of contact between the rolling elements 562 and the inner ring 560) is suppressed.

As shown in FIG. 4, the rotation force applying member 52 is formed of an internal gear of which the central axis coincides with the fourth axis (in the present embodiment, the fourth axis coincides with the rotation axis O). The rotation force applying member 52 is interposed between the first housing element 20 and the second housing element 21. The entirety of the rotation force applying member 52 is formed of an open-end cylindrical member that constitutes part of the housing 2 and that is open toward both sides in the direction of the rotation axis O. The internal gear is an example of the internal gear mechanism. The rotation force applying member 52 is in mesh with the input members 50, 51. The rotation force applying member 52 is configured to apply rotation force in the directions of the arrows $n_1$, $n_2$ to the input member 50 that makes revolving motion upon reception of motor torque from the electric motor 4, and to apply rotation force in the directions of the arrows $l_1$, $l_2$ to the input member 51 that makes revolving motion upon reception of motor torque from the electric motor 4.

The inner periphery of the rotation force applying member 52 has a first fitting portion 52a and a second fitting portion 52b that are located at a predetermined distance in the direction of the rotation axis O. The first fitting portion 52a is fitted to the outer periphery 23b of the protrusion 23. The second fitting portion 52b is fitted to the outer periphery 27b of the protrusion 27. In addition, the inner periphery of the rotation force applying member 52 has internal teeth 52c having an involute tooth profile. The internal teeth 52c are located between the first fitting portion 52a and the second fitting portion 52b, and are in mesh with the external teeth 50c of the input member 50 and the external teeth 51c of the input member 51.

Among both tooth flanks (both torque transfer faces of each internal tooth 52c in the circumferential direction) of each internal tooth 52c, the torque transfer face of the internal tooth 52c at one side in the circumferential direction functions as a rotation force applying face and a revolving force receiving face with respect to the torque transfer face of one of adjacent two external teeth 50c (one of adjacent two external teeth 50c of the input member 50) and the torque transfer face of one of the adjacent two external teeth 51c (one of adjacent two external teeth of the input member 51), and the torque transfer face of the internal tooth 52c at the other side in the circumferential direction functions as a rotation force applying face and a revolving force receiving face with respect to the torque transfer face of the other one of the adjacent two external teeth 50c (the other one of the adjacent two external teeth 50c of the input member 50) and the torque transfer face of the other one of the adjacent two external teeth 51c (the other one of the adjacent two external teeth 51c of the input member 51). The number $Z_3$ of the external teeth 52c is set to 208 ($Z_3$=208), for example. Thus, the reduction gear ratio α of the reduction-transmission mechanism 5 is calculated according to an equation, $\alpha = Z_2/(Z_3 - Z_2)$.

As shown in FIG. 4, the output members 53 are multiple (six, in the present embodiment) bolts each having a threaded portion 53a at one end and a head 53b at the other end. The threaded portions 53a of the output members 53 are passed through the pin insertion holes 50b of the input member 50 and the pin insertion holes 51b of the input member 51 and then fitted in the pin fitting holes 300c of the differential case 30. In addition, the output members 53 are arranged so as to be passed through an annular spacer 58 that is interposed between each head 53b and the input member 51. The output members 53 are configured to receive rotation force, applied by the rotation force applying member 52, from the input members 50, 51, and then output the rotation force to the differential case 30 as the torque of the differential case 30.

The needle roller bearing 55 is fitted to the outer periphery of each output member 53 at a portion between the threaded portion 53a and the head 53b. The needle roller bearing 55 is used to reduce contact resistance between each output member 53 and the inner periphery of the input member 50, which defines the corresponding pin insertion hole 50b. In addition, the needle roller bearing 57 is fitted to the outer periphery of each output member 53 at a portion between the threaded portion 53a and the head 53b. The needle roller bearing 57 is used to reduce contact resistance between each output member 53 and the inner periphery of the input member 51, which defines the corresponding pin insertion hole 51b.

The needle roller bearings 55 each have a race 550 and needle rollers 551. The race 550 is able to contact the inner periphery of the input member 50, which defines a corresponding one of the pin insertion holes 50b. The needle rollers 551 roll between the race 550 and the outer periphery of a corresponding one of the output members 53. The needle roller bearings 57 each have a race 570 and needle rollers 571. The race 570 is able to contact the inner periphery of the input member 51, which defines a corresponding one of the pin insertion holes 51b. The needle rollers 571 roll between the race 570 and the outer periphery of a corresponding one of the output members 53.

Next, the operation of the motor torque transmission device according to the present embodiment will be described with reference to FIG. 1 to FIG. 6.

In FIG. 2, when electric power is supplied to the electric motor 4 of the motor torque transmission device 1 to drive the electric motor 4, the motor torque is applied to the reduction-transmission mechanism 5 via the motor shaft 42. Thus, the reduction-transmission mechanism 5 is actuated.

Therefore, in the reduction-transmission mechanism 5, the input members 50, 51 each make circular motion with the eccentric amount 6, for example, in the direction of the arrow $m_1$ shown in FIG. 3.

Accordingly, the input member 50 rotates about the axis $O_1$ (the direction of the arrow $n_1$ shown in FIG. 3) while the external teeth 50c are meshed with the internal teeth 52c of the rotation force applying member 52. In addition, the input member 51 rotates about the axis $O_2$ (the arrow $l_1$ direction shown in FIG. 3) while the external teeth 51c are meshed with the internal teeth 52c of the rotation force applying member 52. In this case, due to the rotation of the input members 50, 51, the inner peripheries of the input member 50, which define the pin insertion holes 50b, contact the races 550 of the needle roller bearings 55, and the inner peripheries of the input member 51, which define the pin insertion holes 51b, contact the races 570 of the needle roller bearings 57.

Therefore, the revolving motions of the input members 50, 51 are not transmitted to the output members 53 and only the rotating motions of the input members 50, 51 are transmitted to the output members 53. Rotation force resulting from the rotating motions is output from the input members 50, 51 through the output members 53 to the differential case 30 as the torque of the differential case 30.

In this way, the rear differential 3 is actuated, and driving force based on the motor torque of the electric motor 4 is distributed to the rear axle shafts 106 shown in FIG. 1, and transmitted to the right and left rear wheels 105.

As the motor torque transmission device 1 operates, the centrifugal force $P_1$ acts on the input member 50 on the basis of the circular motion of the input member 50, and the centrifugal force $P_2$ acts on the input member 51 on the basis of the circular motion of the input member 51.

Accordingly, the input member 50 moves in a direction in which the centrifugal force $P_1$ acts (for example, downward in FIG. 6), and the input member 51 moves in a direction in which the centrifugal force $P_2$ acts (for example, upward in FIG. 6).

In this case, as shown in FIG. 4 to FIG. 6, when the input member 50 moves in the direction in which the centrifugal force $P_1$ acts, upon reception of a load due to the centrifugal force $P_1$ that is generated on the basis of the circular motion of the input member 50, the outer periphery 500d of the protrusion 50d contact the inner periphery 23a of the protrusion 23 as shown in FIG. 5A and FIG. 5B before the input member 50 moves over a distance corresponding to the size that is smaller than or equal to half of the size obtained by adding the diameter difference $(d_1-D_1)$ between the outside diameter $D_1$ of the ball bearing 54 and the inside diameter d1 of the input member 50, which defines the center hole 50a, the diameter difference $(D_2-d_2)$ between the inside diameter $D_2$ of the ball bearing 54 and the outside diameter $d_2$ of the eccentric portion 42a, and the operating clearance $G_1$ of the radial internal clearance of the ball bearing 54.

Therefore, the inner periphery 23a of the protrusion 23 intensively receive a load due to the centrifugal force $P_1$ from the input member 50. Therefore, application of the load due to the centrifugal force $P_1$ to the ball bearing 54 is suppressed.

Similarly, when the input member 51 moves in the direction in which the centrifugal force $P_2$ acts, upon reception of a load due to the centrifugal force $P_2$ that is generated on the basis of the circular motion of the input member 51, the outer periphery 510d of the protrusion 51d contact the inner periphery 27a of the protrusion 27 as shown in FIG. 5A and FIG. 5B before the input member 51 moves over a distance corresponding to the size that is smaller than or equal to half of the size obtained by adding the diameter difference $(d_3-D_3)$ between the outside diameter $D_3$ of the ball bearing 56 and the inside diameter d3 of the input member 51, which defines the center hole 51a, the diameter difference $(D_4-d_4)$ between the inside diameter $D_4$ of the ball bearing 56 and the outside diameter $d_4$ of the eccentric portion 42b, and the operating clearance $G_2$ of the radial internal clearance of the ball bearing 56.

Therefore, the inner periphery 27a of the protrusion 27 intensively receive a load due to the centrifugal force $P_2$ from the input member 51. Therefore, application of the load due to the centrifugal force $P_2$ to the ball bearing 56 is suppressed.

Therefore, according to the present embodiment, it is no longer necessary to employ bearings having high durability as the ball bearings 54, 56.

In the above-described embodiment, the description is made on the case where the motor torque transmission device 1 is actuated by causing the input members 50, 51 to make circular motion in the direction of the arrow $m_1$. However, the motor torque transmission device 1 may be actuated in the same manner as that in the above-described embodiment even when the input members 50, 51 are caused to make circular motion in the direction of the arrow $m_2$. In this case, the rotating motion of the input member 50 is made in the direction of the arrow $n_2$, and the rotating motion of the input member 51 is made in the direction of the arrow $l_2$.

According to the above-described first embodiment, the following advantageous effects are obtained.

(1) Application of the load due to the centrifugal force $P_1$ from the input member 50 to the ball bearing 54 and application of the load due to the centrifugal force $P_2$ from the input member 51 to the ball bearing 56 are suppressed. Therefore, it is no longer necessary to employ bearings having high durability as the ball bearings 54, 56. Accordingly, it is possible to reduce cost.

(2) Application of the load due to the centrifugal force $P_1$ to the ball bearing 54 and application of the load due to the centrifugal force $P_2$ to the ball bearing 56 are suppressed. Therefore, it is possible to extend the service life of each of the ball bearings 54, 56.

In the present embodiment, the description is made on the case where the annular protrusion 50d that protrudes toward the rear differential 3 along the direction of the axis $O_{1'}$ is formed integrally with the input member 50, and the annular protrusion 51d that protrudes toward the electric motor 4 along the direction of the axis $O_{2'}$ is formed integrally with the input member 51. However, the invention is not limited to this configuration, and a structure shown in FIG. 7 (first modified example) may be employed.

Figure 7:
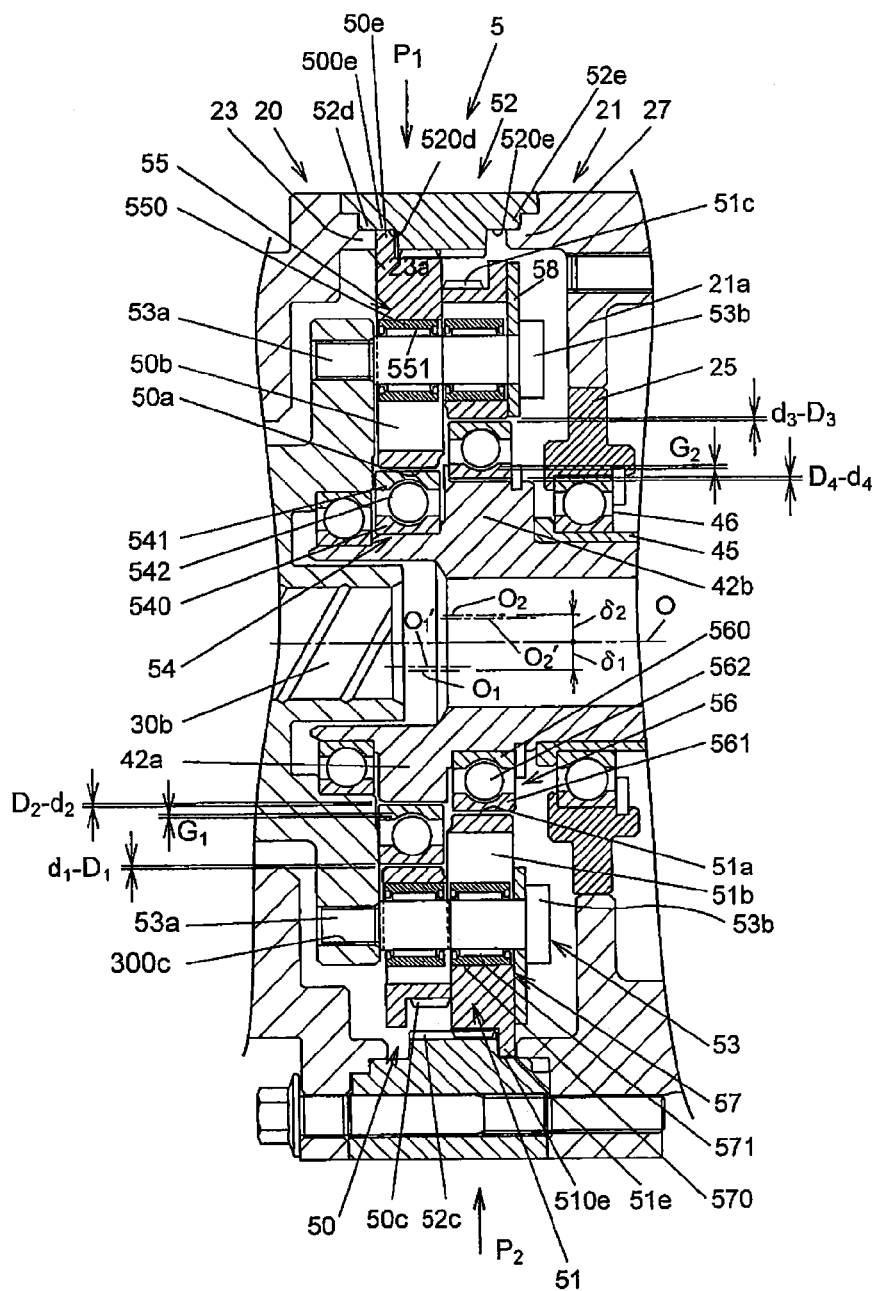
FIG. 7 is a sectional view that schematically shows the main portions of the reduction-transmission mechanism of the motor torque transmission device a in a first modified example according to the first embodiment of the invention.

A first modified example will be described below. As shown in FIG. 7, the input member 50 has an annular protrusion (first protrusion) 50e that protrudes in a direction perpendicular to the axis $O_{1'}$, at an end portion on the rear differential 3 side, and the input member 51 has an annular protrusion (first protrusion) 51e that protrudes in a direction perpendicular to the axis $O_{2'}$, at an end portion on the electric motor 4 side.

The rotation force applying member 52 has an annular protrusion 52d at an end portion on the second side (left side in FIG. 7). The protrusion 52d protrudes in a direction perpendicular to the rotation axis O, and has an inner periphery 520d that contacts an outer periphery 500e of the protrusion (first protrusion) 50e in a state where the input member 50 receives a load due to the centrifugal force $P_1$ that is generated on the basis of the circular motion of the input member 50. The rotation force applying member 52 has an annular protrusion (second protrusion) 52e at an end portion on the first side (right side in FIG. 7). The protrusion 52e protrudes in a direction perpendicular to the rotation axis O, and has an inner periphery 520e that contacts an outer periphery 510e of the protrusion 51e in a state where the input member 51 receives a load due to the centrifugal force $P_2$ that is generated on the basis of the circular motion of the input member 51.

In the present embodiment, the description is made on the case where the input member 50 has the annular protrusion 50d that has the outer periphery 500d that is fitted to the inner periphery 23a of the protrusion 23 of the first housing element 20 and the input member 51 has the annular protrusion 51d that has the outer periphery 510d that is fitted to the inner periphery 27a of the protrusion 27 of the second housing element 21. However, the invention is not limited to this configuration, and a structure shown in FIG. 8 (second modified example) may be employed.

Figure 8:
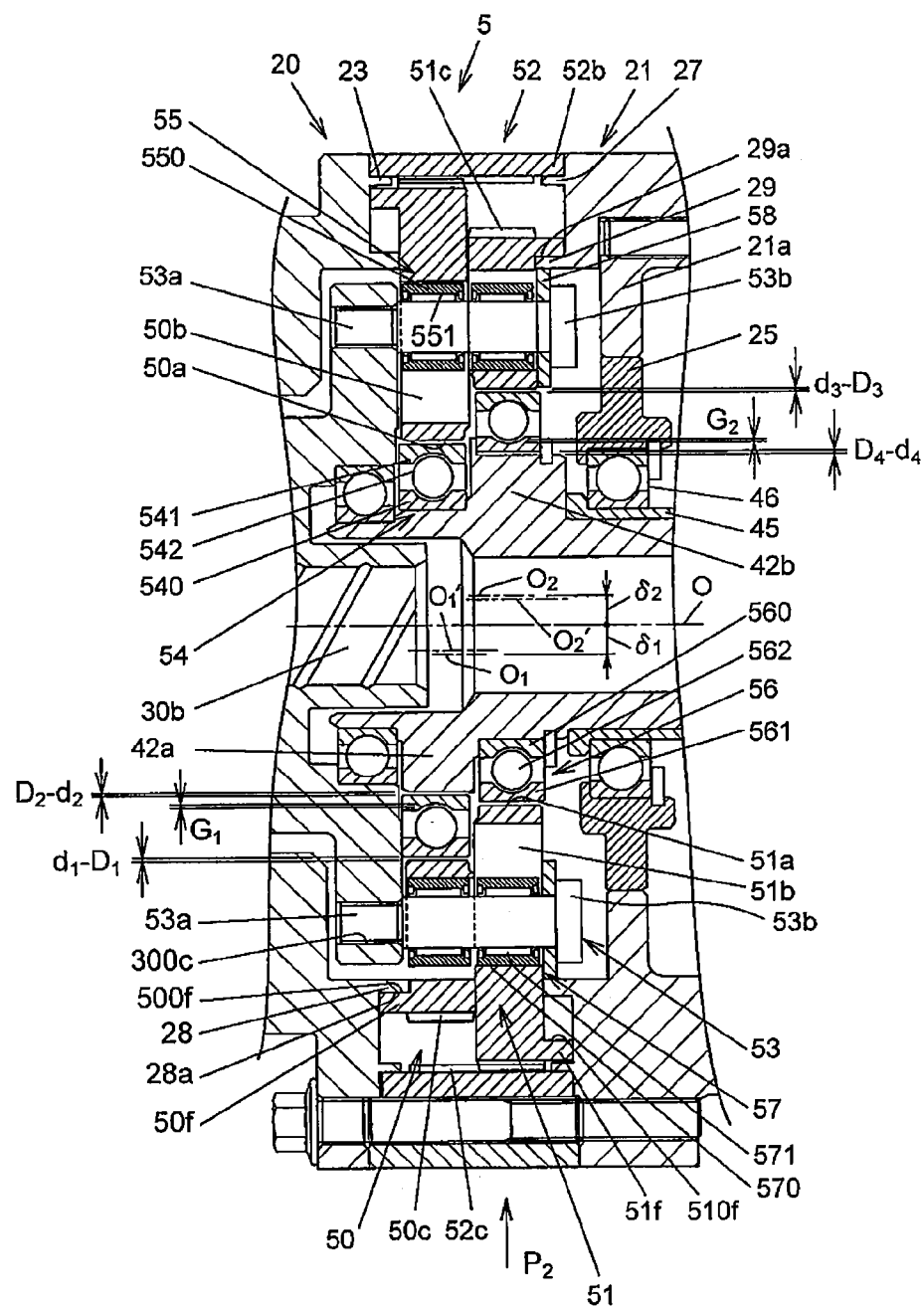
FIG. 8 is a sectional view that schematically shows the main portions of the reduction-transmission mechanism of the motor torque transmission device a in a second modified example according to the first embodiment of the invention.

A second modified example will be described below. As shown in FIG. 8, an annular protrusion (second protrusion) 28 that protrudes toward the electric motor 4 along the direction of the rotation axis O is formed integrally with the first housing element 20 at an end portion on the electric motor 4 side, and an annular protrusion (second protrusion) 29 that protrudes toward the rear differential 3 along the direction of the rotation axis O is formed integrally with the housing element 21 at an end portion on the rear differential 3 side.

A protrusion (first protrusion) 50f that has an inner periphery 500f that is fitted to an outer periphery 28a of the protrusion 28 of the first housing element 20 is formed integrally with the input member 50 at an end portion on the rear differential 3 side, and a protrusion (first protrusion) 51f that has an inner periphery 510f that is fitted to an outer periphery 29a of the protrusion 29 of the second housing element 21 is formed integrally with the input member 51 at an end portion on the electric motor 4 side.

Figure 9:
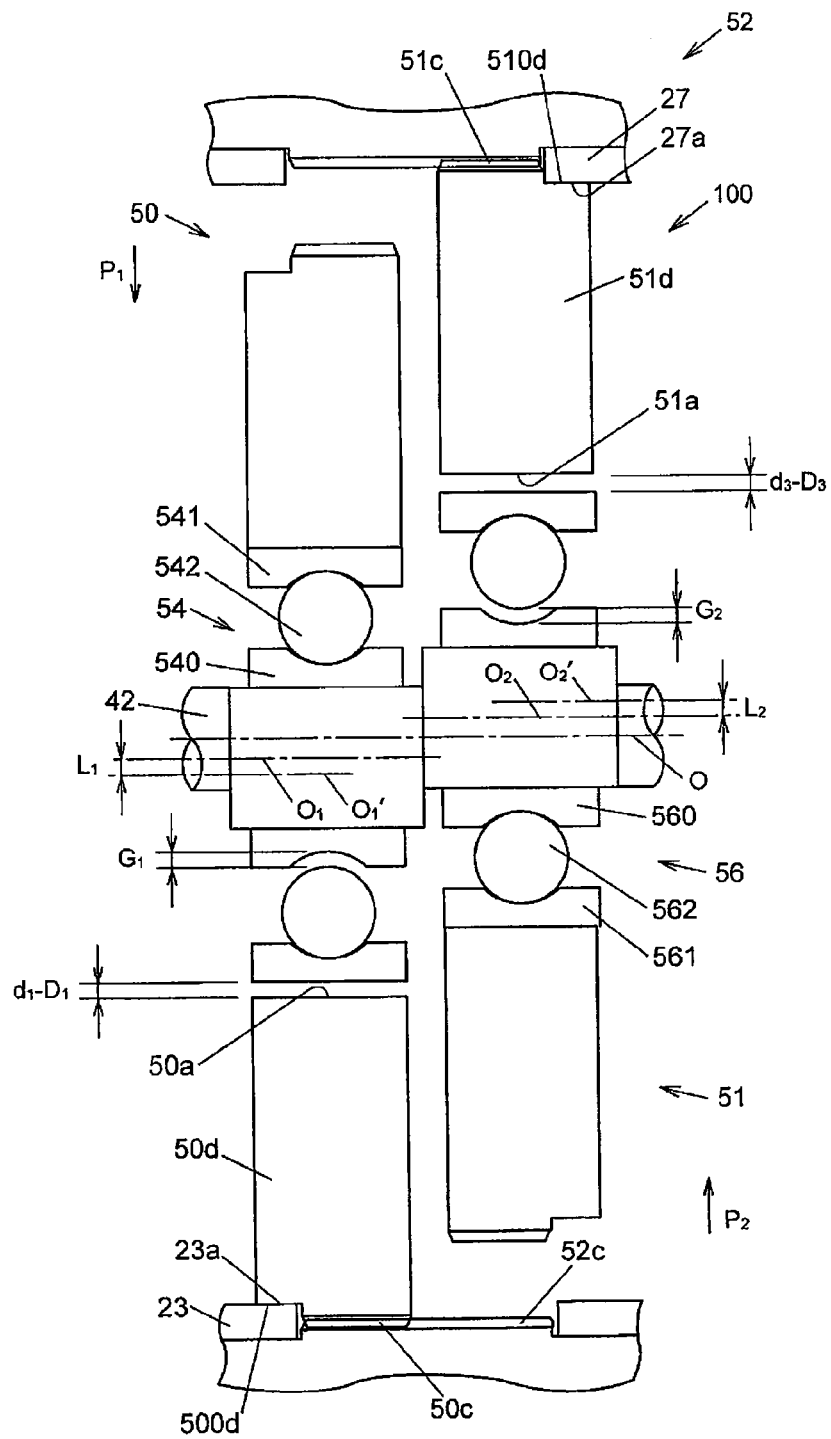
FIG. 9 is a simplified sectional view that shows a state where input members of a reduction-transmission mechanism are supported in a motor torque transmission device according to a second embodiment of the invention.

Next, a reduction-transmission mechanism in a motor torque transmission device according to a second embodiment of the invention will be described with reference to FIG. 4, FIG. 5A, FIG. 5B and FIG. 9. FIG. 9 shows a state where input members are supported. In FIG. 9, the components that are identical or equivalent to those in FIG. 6 are denoted by the same reference numerals as those in FIG. 6, and the detailed description is omitted.

As shown in FIG. 4 and FIG. 9, a reduction-transmission mechanism 100 (partially shown) according to the second embodiment of the invention is characterized in that the inner rings 540, 560 of the ball bearings 54, 56 are fitted to the outer peripheries of the eccentric portions 42a, 42b by interference fit, and the outer rings 541, 561 are fitted to the inner peripheries of the input members 50, 51, which define the center holes 50a, 51a, by clearance fit.

In a state where the outer periphery 500d of the protrusion 50d is in contact with the inner periphery 23a of the protrusion 23 of the first housing element 20 due to the movement of the input member 50 on the line perpendicular to the rotation axis O and the axis O1, the outer ring 541 is fitted in the center hole 50a with a clearance in the radial direction of the motor shaft 42. Therefore, the size $L_1$ between the axis $O_1$ and the axis $O_{1'}$ is set to a size that is smaller than or equal to half of a size $\{(d_1-D_1)+G_1\}$ obtained by adding the diameter difference $d_1-D_1$ between the outside diameter $D_1$ of the ball bearing 54 and the inside diameter $d_1$ of the input member 50, which defines the center hole 50a, and the operating clearance $G_1$ of the radial internal clearance of the ball bearing 54, that is, $\{(d_1-D_1)+G_1\}/2 \geq L_1$.

That is, the size $L_1$ is set to such a size that the outer periphery 500d of the protrusion 50d contacts the inner periphery 23a of the protrusion 23 as shown in FIG. 5A and FIG. 5B before the input member 50 moves from its initial state over a distance corresponding to the size that is smaller than or equal to half of the size obtained by adding the diameter difference $(d_1-D_1)$ between the outside diameter $D_1$ of the ball bearing 54 and the inside diameter $d_1$ of the input member 50, which defines the center hole 50a, and the operating clearance $G_1$ of the radial internal clearance of the ball bearing 54.

Therefore, as the input member 50 moves in the direction in which the centrifugal force $P_1$ acts, upon reception of a load due to the centrifugal force $P_1$ that is generated on the basis of the circular motion of the input member 50, the outer periphery 500d of the protrusion 50d contacts the inner periphery 23a of the protrusion 23. At this contact position, the first housing element 20 receives a radial load from the input member 50. Thus, the inner periphery 23a of the protrusion 23 of the first housing element 20 intensively receives a load due to the centrifugal force $P_1$ from the input member 50. Therefore, application of the load due to the centrifugal force $P_1$ to the ball bearing 54 (to the points of contact between the outer ring 541 and the rolling elements 542 and the points of contact between the rolling elements 542 and the inner ring 540) is suppressed.

In a state where the outer periphery 510d of the protrusion 51d has been brought into contact with the inner periphery 27a of the protrusion 27 of the second housing element 21 due to the movement of the input member 51 on the line perpendicular to the rotation axis O and the axis $O_2$, the outer ring 561 is fitted in the center hole 51a with a clearance in the radial direction of the motor shaft 42. Therefore, the size $L_2$ between the axis $O_2$ and the axis $O_{2'}$ is set to a size that is smaller than or equal to half of a size $\{(d_3-D_3)+G_2\}$ obtained by adding the diameter difference $d_3-D_3$ between the outside diameter $D_3$ of the ball bearing 56 and the inside diameter $d_3$ of the input member 51, which defines the center hole 51a, and the operating clearance $G_2$ of the radial internal clearance of the ball bearing 56, that is, $\{(d_3-D_3)+G_2\}/2 \geq L_2$.

That is, the size $L_2$ is set to such a size that the outer periphery 510d of the protrusion 51d contacts the inner periphery 27a of the protrusion 27 as shown in FIG. 5A and FIG. 5B before the input member 51 moves from its initial state over a distance corresponding to the size that is smaller than or equal to half of the size obtained by adding the diameter difference $(d_3-D_3)$ between the outside diameter $D_3$ of the ball bearing 56 and the inside diameter $d_3$ of the input member 51, which defines the center hole 51a, and the operating clearance $G_2$ of the radial internal clearance of the ball bearing 56.

Therefore, when the input member 51 moves in the direction of the centrifugal force $P_2$ upon reception of a load due to the centrifugal force $P_2$ that is generated on the basis of the circular motion of the input member 51, the outer periphery 510d of the protrusion 51d contacts the inner periphery 27a of the protrusion 27. At this contact position, the second housing element 21 receives a radial load from the input member 51. Thus, the inner periphery 27a of the protrusion 27 of the second housing element 21 intensively receives a load due to the centrifugal force $P_2$ from the input member 51. Therefore, application of the load due to the centrifugal force $P_2$ to the ball bearing 56 (to the points of contact between the outer ring 561 and the rolling elements 562 and the points of contact between the rolling elements 562 and the inner ring 560) is suppressed.

According to the above-described second embodiment, similar advantageous effects to those of the first embodiment are obtained.

Figure 10:
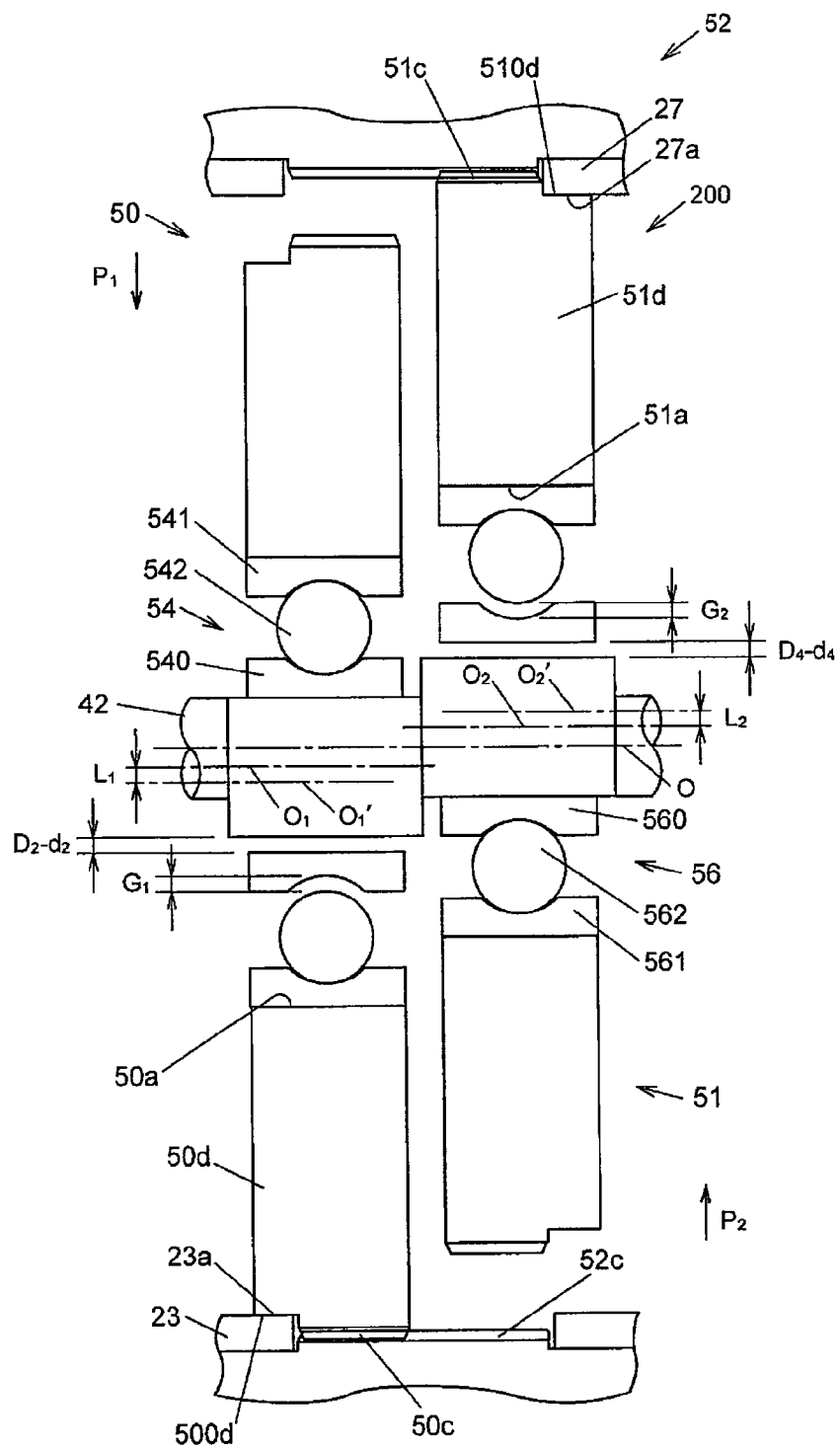
FIG. 10 is a simplified sectional view that shows a state where input members of a reduction-transmission mechanism are supported in a motor torque transmission device according to a third embodiment of the invention.

Next, a reduction-transmission mechanism in a motor torque transmission device according to a third embodiment of the invention will be described with reference to FIG. 4, FIG. 5A, FIG. 5B and FIG. 10. FIG. 10 shows a state where input members are supported. In FIG. 10, the components that are identical or equivalent to those in FIG. 6 are denoted by the same reference numerals as those in FIG. 6, and the detailed description is omitted.

As shown in FIG. 4 and FIG. 10, a reduction-transmission mechanism 200 (partially shown) according to the third embodiment of the invention is characterized in that the inner rings 540, 560 of the ball bearings 54, 56 are fitted to the outer peripheries of the eccentric portions 42a, 42b by clearance fit. In addition, the reduction-transmission mechanism 200 is characterized in that the outer rings 541, 561 are fitted to the inner peripheries of the input members 50, 51, which define the center holes 50a, 51a, by interference fit.

In a state where the outer periphery 500d of the protrusion 50d has been brought into contact with the inner periphery 23a of the protrusion 23 of the first housing element 20 due to the movement of the input member 50 on the line perpendicular to the rotation axis O and the axis $O_1$, the inner ring 540 is fitted to the eccentric portion 42a with a clearance in the radial direction of the motor shaft 42. Therefore, the size $L_1$ between the axis $O_1$ and the axis $O_{1'}$ is set to a size that is smaller than or equal to half of a size $\{(D_2-d_2)+G_1\}$ obtained by adding the diameter difference $D_2-d_2$ between the inside diameter $D_2$ of the ball bearing 54 and the outside diameter $d_2$ of the eccentric portion 42a and the operating clearance $G_1$ of the radial internal clearance of the ball bearing 54, that is, $\{(D_2-d_2)+G_1\}/2 \geq L_1$.

That is, the size $L_1$ is set to such a size that the outer periphery 500d of the protrusion 50d contacts the inner periphery 23a of the protrusion 23 as shown in FIG. 5A and FIG. 5B before the input member 50 moves from its initial state over a distance corresponding to the size that is smaller than or equal to half of the size obtained by adding the diameter difference $(D_2-d_2)$ between the inside diameter $D_2$ of the ball bearing 54 and the outside diameter $d_2$ of the eccentric portion 42a and the operating clearance $G_1$ of the radial internal clearance of the ball bearing 54.

Therefore, when the input member 50 moves in the direction of the centrifugal force $P_1$ upon reception of a load due to the centrifugal force $P_1$ that is generated on the basis of the circular motion of the input member 50, the outer periphery 500d of the protrusion 50d contacts the inner periphery 23a of the protrusion 23. At this contact position, the first housing element 20 receives a radial load from the input member 50. Thus, the inner periphery 23a of the protrusion 23 of the first housing element 20 intensively receives a load due to the centrifugal force $P_1$ from the input member 50. Therefore, application of the load due to the centrifugal force $P_1$ to the ball bearing 54 (to the points of contact between the outer ring 541 and the rolling elements 542 and the points of contact between the rolling elements 542 and the inner ring 540) is suppressed.

In a state where the outer periphery 510d of the protrusion 51d is in contact with the inner periphery 27a of the protrusion 27 of the second housing element 21 due to the movement of the input member 51 on the line perpendicular to the rotation axis O and the axis $O_2$, the inner ring 560 is fitted to the eccentric portion 42b with a clearance in the radial direction of the motor shaft 42. Therefore, the size $L_2$ between the axis $O_2$ and the axis $O_{2'}$ is set to a size that is smaller than or equal to half of a size $\{(D_4-d_4)+G_2\}$ obtained by adding the diameter difference $D_4-d_4$ between the inside diameter $D_4$ of the ball bearing 56 and the outside diameter $d_4$ of the eccentric portion 42b and the operating clearance $G_2$ of the radial internal clearance of the ball bearing 56, that is, $\{(D_4-d_4)+G_2\}/2 \geq L_2$.

That is, the size $L_2$ is set to such a size that the outer periphery 510d of the protrusion 51d contacts the inner periphery 27a of the protrusion 27 as shown in FIG. 5A and FIG. 5B before the input member 51 moves from its initial state over a distance corresponding to the size that is smaller than or equal to half of the size obtained by adding the diameter difference $(D_4-d_4)$ between the inside diameter $D_4$ of the ball bearing 56 and the outside diameter $d_4$ of the eccentric portion 42b and the operating clearance $G_2$ of the radial internal clearance of the ball bearing 56.

Therefore, when the input member 51 moves in the direction of the centrifugal force $P_2$ upon reception of a load due to the centrifugal force $P_2$ that is generated on the basis of the circular motion of the input member 51, the outer periphery 510d of the protrusion 51d contacts the inner periphery 27a of the protrusion 27. At this contact position, the second housing element 21 receives a radial load from the input member 51. Thus, the inner periphery 27a of the protrusion 27 of the second housing element 21 intensively receives a load due to the centrifugal force $P_2$ from the input member 51. Therefore, application of the load due to the centrifugal force $P_2$ to the ball bearing 56 (to the points of contact between the outer ring 561 and the rolling elements 562 and the points of contact between the rolling elements 562 and the inner ring 560) is suppressed.

According to the above-described third embodiment, similar advantageous effects to those of the first embodiment are obtained.

Figure 11:
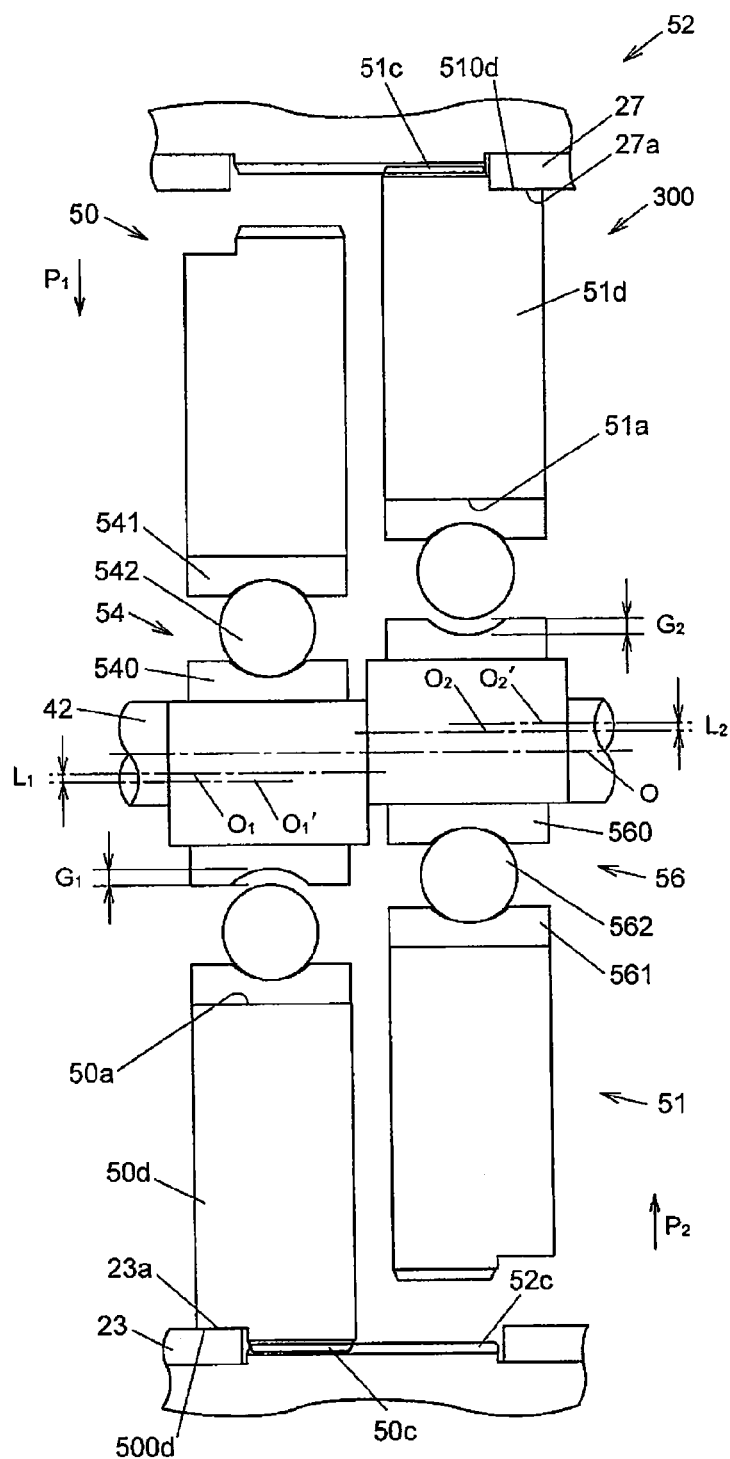
FIG. 11 is a simplified sectional view that shows a state where input members of a reduction-transmission mechanism are supported in a motor torque transmission device according to a fourth embodiment of the invention.
Figure 12:
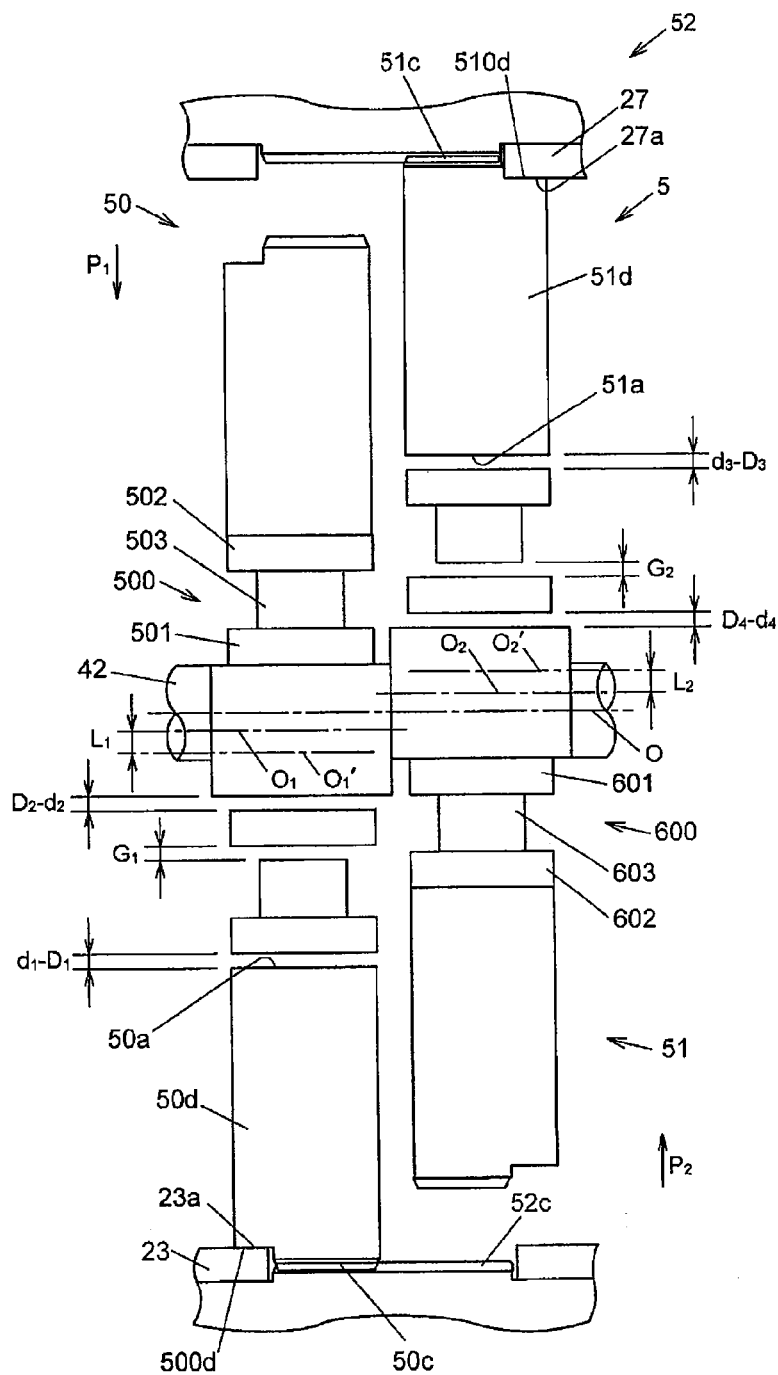
FIG. 12 is a simplified sectional view that shows the state where the input members of the reduction-transmission mechanism are supported in the motor torque transmission device in a third modified example according to the first embodiment of the invention.
Figure 13:
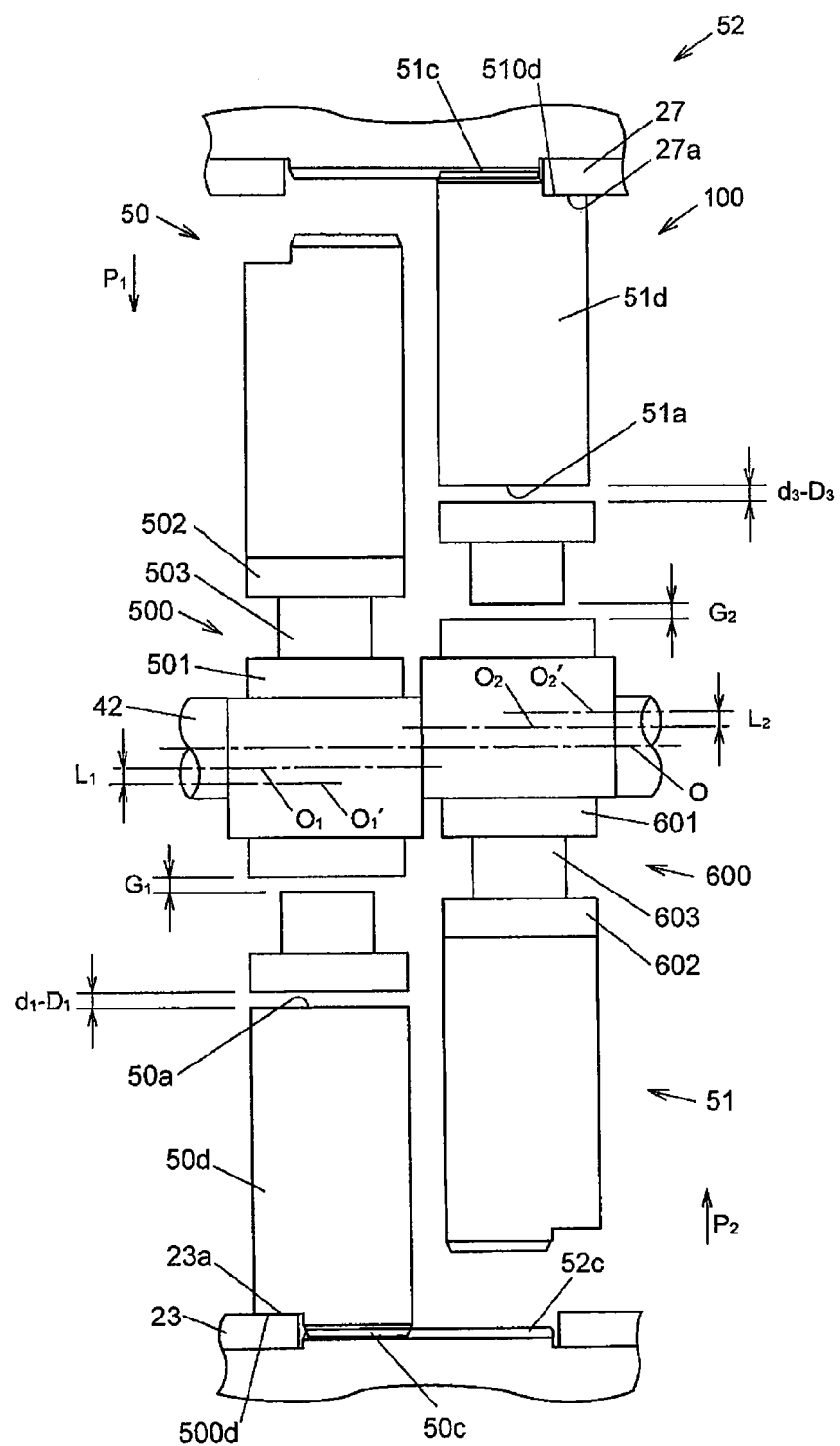
FIG. 13 is a simplified sectional view that shows the state where the input members of the reduction-transmission mechanism are supported in the motor torque transmission device in a fourth modified example according to the second embodiment of the invention.
Figure 14:
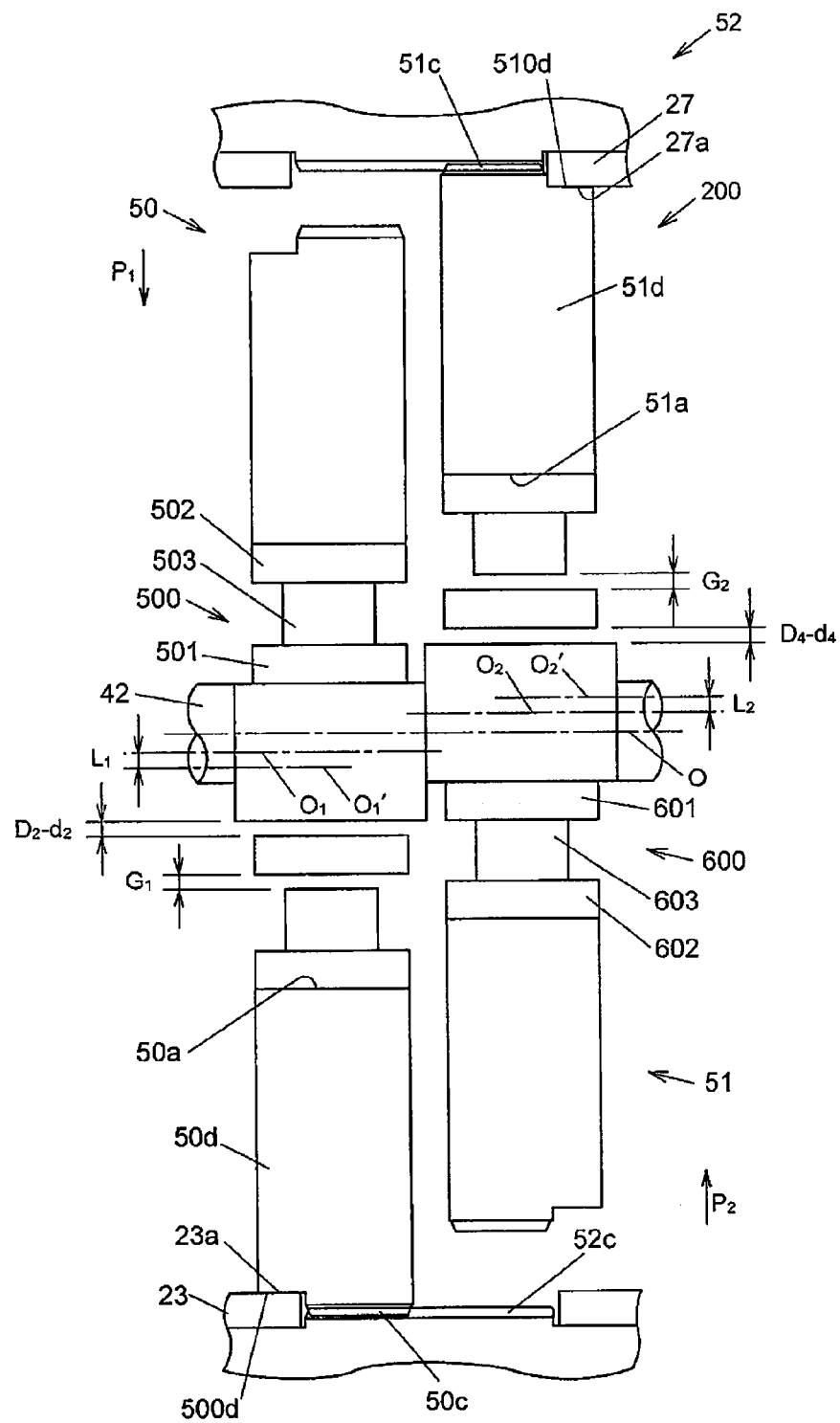
FIG. 14 is a simplified sectional view that shows the state where the input members of the reduction-transmission mechanism are supported in the motor torque transmission device in a fifth modified example according to the third embodiment of the invention.
Figure 15:
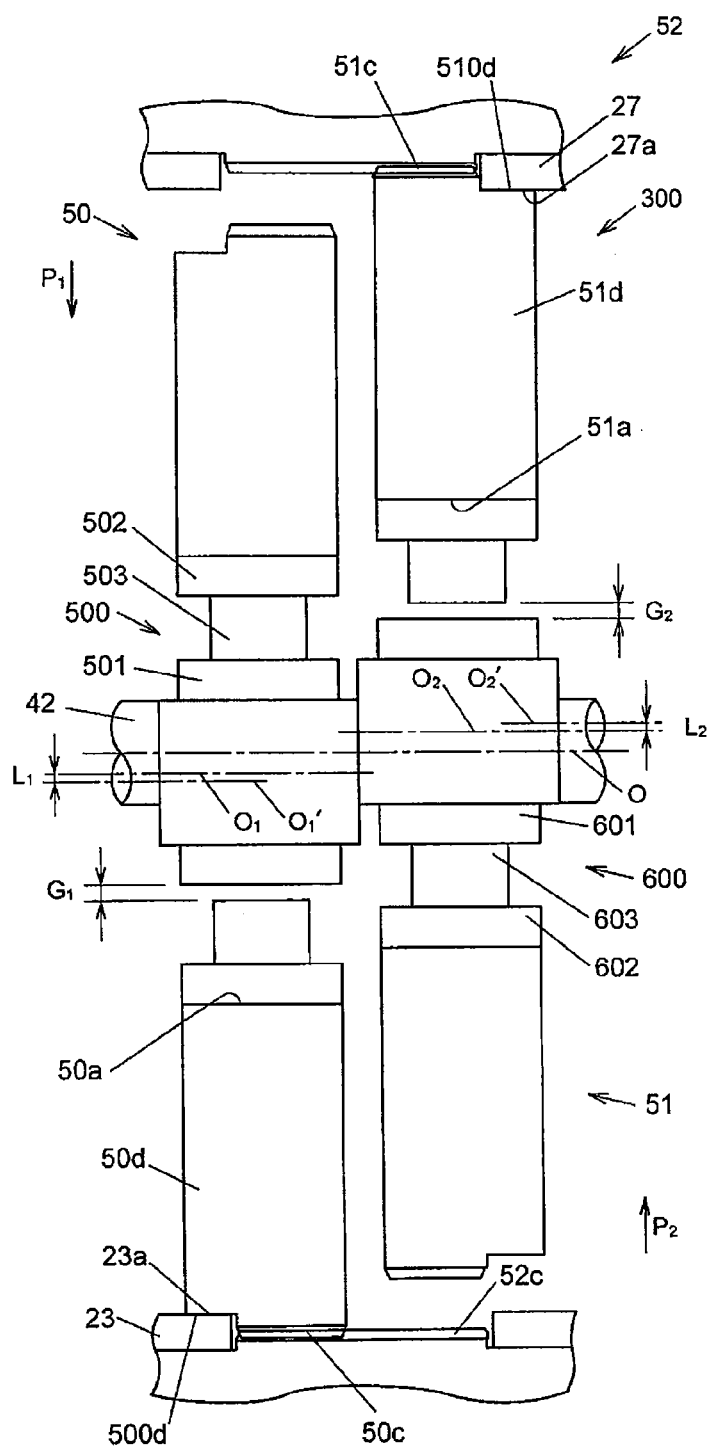
FIG. 15 is a simplified sectional view that shows the state where the input members of the reduction-transmission mechanism are supported in the motor torque transmission device in a sixth modified example according to the fourth embodiment of the invention.

Next, a reduction-transmission mechanism in a motor torque transmission device according to a fourth embodiment of the invention will be described with reference to FIG. 4, FIG. 5A, FIG. 5B and FIG. 11. FIG. 11 shows a state where input members are supported. In FIG. 11, the components that are identical or equivalent to those in FIG. 6 are denoted by the same reference numerals as those in FIG. 6, and the detailed description is omitted.

As shown in FIG. 4 and FIG. 11, a reduction-transmission mechanism 300 (partially shown) according to the fourth embodiment of the invention is characterized in that the inner rings 540, 560 of the ball bearings 54, 56 are fitted to the respective outer peripheries of the eccentric portions 42a, 42b by interference fit, and the outer rings 541, 561 are fitted to the respective inner peripheries of the input members 50, 51, which defines the center holes 50a, 51a, by interference fit.

The size $L_1$ between the axis $O_1$ and the axis $O_{1'}$ is set to a size that is smaller than or equal to half of the operating clearance $G_1$ of the radial internal clearance of the ball bearing 54, that is, $G_1/2 \geq L_1$, in a state where the outer periphery 500d of the protrusion 50d has been brought into contact with the inner periphery 23a of the protrusion 23 of the first housing element 20 due to the movement of the input member 50 on the line perpendicular to the rotation axis O and the axis $O_1$.

That is, the size $L_1$ is set to such a size that the outer periphery 500d of the protrusion 50d contacts the inner periphery 23a of the protrusion 23 as shown in FIG. 5A and FIG. 5B before the input member 50 moves from its initial state over a distance corresponding to the size that is smaller than or equal to half of the operating clearance $G_1$ of the radial internal clearance of the ball bearing 54.

Therefore, when the input member 50 moves in the direction of the centrifugal force $P_1$ upon reception of a load due to the centrifugal force $P_1$ that is generated on the basis of the circular motion of the input member 50, the outer periphery 500d of the protrusion 50d contacts the inner periphery 23a of the protrusion 23. At this contact position, the first housing element 20 receives a radial load from the input member 50. Thus, the inner periphery 23a of the protrusion 23 in the first housing element 20 intensively receives a load due to the centrifugal force $P_1$ from the input member 50. Therefore, application of the load due to the centrifugal force $P_1$ to the ball bearing 54 (to the points of contact between the outer ring 541 and the rolling elements 542 and the points of contact between the rolling elements 542 and the inner ring 540) is suppressed.

The size $L_2$ between the axis $O_2$ and the axis $O_{2'}$ is set to a size that is smaller than or equal to half of the operating clearance $G_2$ of the radial internal clearance of the ball bearing 56, that is, $G_2/2 \geq L_2$, in a state where the outer periphery 510d of the protrusion 51d has been brought into contact with the inner periphery 27a of the protrusion 27 of the second housing element 21 due to the movement of the input member 51 on the line perpendicular to the rotation axis O and the axis $O_2$.

That is, the size $L_2$ is set to such a size that the outer periphery 510d of the protrusion 51d contacts the inner periphery 27a of the protrusion 27 as shown in FIG. 5A and FIG. 5B before the input member 51 moves from its initial state over a distance corresponding to the size that is smaller than or equal to half of the operating clearance $G_2$ of the radial internal clearance of the ball bearing 56.

Therefore, when the input member 51 moves in the direction of the centrifugal force $P_2$ upon reception of a load due to the centrifugal force $P_2$ that is generated on the basis of the circular motion of the input member 51, the outer periphery 510*d* of the protrusion 51*d* contacts the inner periphery 27*a* of the protrusion 27. At this contact position, the second housing element 21 receives a radial load from the input member 51. Thus, the inner periphery 27*a* of the protrusion 27 of the second housing element 21 intensively receives a load due to the centrifugal force $P_2$ from the input member 51. Therefore, application of the load due to the centrifugal force $P_2$ to the ball bearing 56 (to the points of contact between the outer ring 561 and the rolling elements 562 and the points of contact between the rolling elements 562 and the inner ring 560) is suppressed.

According to the above-described fourth embodiment, similar advantageous effects to those of the first embodiment are obtained.

As described above, the speed reduction mechanism according to the invention and the motor torque transmission device that includes the speed reduction mechanism are described on the basis of the above embodiments. However, the invention is not limited to the above embodiments. The invention may be implemented in various other embodiments without departing from the scope of the invention. For example, the following modifications may be made.

(1) In the above-described embodiments, the eccentric portion 42*a* and the eccentric portion 42*b* are arranged on the outer periphery of the motor shaft 42 such that the distance from the axis $O_1$ to the rotation axis O and the distance from the axis $O_2$ to the rotation axis O are equal to each other and the distance between the axis $O_1$ and the axis $O_2$ in one of the circumferential directions around the rotation axis O and the distance between the axis $O_1$ and the axis $O_2$ in the other circumferential direction around the rotation axis O are equal to each other, and the pair of input members 50, 51 are arranged on the portions that are formed on the motor shaft 42 of the electric motor 4 so as to be apart from each other in the circumferential direction around the axis (rotation axis O) of the motor shaft 42 at equal intervals (180°). However, the invention is not limited to this configuration, and the number of the input members may be appropriately changed.

That is, when the number of the input members is n (n≥3), the axis of the first eccentric portion, the axis of the second eccentric portion, . . . , and the axis of the nth eccentric portion are sequentially arranged in one direction around the axis of the motor shaft, on an imaginary plane perpendicular to the axis of the electric motor (motor shaft). Then, the eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion, . . . , and the nth eccentric portion is set to 360°/n. Furthermore, the n input members are arranged on the motor shaft at portions that are apart from each other at intervals of 360°/n around the axis of the motor shaft.

For example, when the number of the input members is three, the axis of the first eccentric portion, the axis of the second eccentric portion and the axis of the third eccentric portion are sequentially arranged in one direction around the axis of the motor shaft, on an imaginary plane perpendicular to the axis of the motor shaft. The eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion and the third eccentric portion is set to 120°. Furthermore, the three input members are arranged on the motor shaft at portions that are apart from each other at intervals of 120° around the axis of the motor shaft.

(2) In the above-described embodiments, the description is made on the case where the invention is applied to the four-wheel drive vehicle 101 that uses the engine 102 and the electric motor 4 as the driving sources. However, the invention is not limited to this configuration. The invention may also be applied to an electric vehicle, which is a four-wheel drive vehicle or a two-wheel drive vehicle, using only an electric motor as a driving source. In addition, the invention may also be applied to a four-wheel drive vehicle having first drive shafts that are driven by an engine and an electric motor and second drive shafts that are driven by an electric motor as in the case of the above-described embodiments.

(3) In the above-described embodiments, the description is made on the case where the ball bearings 54, 56 that are deep groove ball bearings are used as first bearings between the inner peripheries of the input members 50, 51, which define the center holes 50*a*, 51*a*, and the outer peripheries of the eccentric portions 42*a*, 42*b* such that the input members 50, 51 are rotatably supported on the eccentric portions 42*a*, 42*b*. However, the invention is not limited to this configuration, and ball bearings or roller bearings, other than deep groove ball bearings, may be used as first bearings instead of the deep groove ball bearings. Such a ball bearing or a roller bearing may be, for example, an angular contact ball bearing, a needle roller bearing, a long cylindrical roller bearing, a cylindrical roller bearing, a tapered roller bearing, a spherical roller bearing, or the like. In addition, the first bearing according to the invention may be a plain bearing instead of a rolling bearing.

For example, as shown in FIG. 12 to FIG. 15, when a cylindrical roller bearing 500 (an inner ring 501, an outer ring 502, and rolling elements 503) and a cylindrical roller bearing 600 (an inner ring 601, an outer ring 602, and rolling elements 603) are used as first bearings, the input member 50 is rotatably supported by the eccentric portion 42*a* via the cylindrical roller bearing 500, and the input member 51 is rotatably supported by the eccentric portion 42*b* via the cylindrical roller bearing 600. In this case, FIG. 12, FIG. 13, FIG. 14 and FIG. 15 correspond to FIG. 6, FIG. 9, FIG. 10 and FIG. 11, respectively. In FIG. 12 to FIG. 15, the cylindrical roller bearing 500 instead of the ball bearing 54 described in the above embodiments is interposed between the inner periphery of the input member 50, which defines the center hole 50*a*, and the outer periphery of the eccentric portion 42*a*, and the cylindrical roller bearing 600 instead of the ball bearing 56 described in the above embodiments is interposed between the inner periphery of the input member 51, which defines the center hole 51*a*, and the outer periphery of the eccentric portion 42*b*.

(4) In the above embodiments, the description is made on the case where each needle roller bearing 55 that serves as a second bearing and that is able to contact the inner periphery of the input member 50, which defines a corresponding one of the pin insertion holes 50*b*, is fitted to the outer periphery of each of the output members 53 at a portion between the threaded portion 53*a* and the head 53*b*, and each needle roller bearing 57 that serves as a second bearing and that is able to contact the inner periphery of the input member 51, which defines a corresponding one of the pin insertion holes 51*b*, is fitted to the outer periphery of each of the output members 53 at a portion between the threaded portion 53*a* and the head 53*b*. However, the invention is not limited to this configuration. A roller bearing other than a needle roller bearing or a ball bearing may be used instead of the needle roller bearing.

Such a ball bearing or a roller bearing may be, for example, a deep groove ball bearing, an angular contact ball bearing, a cylindrical roller bearing, a long cylindrical roller bearing, a tapered roller bearing, a spherical roller bearing, or the like. In addition, the second bearing according to the invention may be a plain bearing instead of a rolling bearing.

(5) In the above-described embodiments, the description is made on the example in which, when the input members 50, 51 are arranged at equal intervals around the rotation axis O of the motor shaft 42, that is, when the rotation axis (first axis) O of the motor shaft 42 coincides with the axis (fourth axis) of the rotation force applying member 52, the size between the second axis $O_1$ and the third axis $O_1$, and the size between the second axis $O_2$ and the third axis $O_2$, each are set to a predetermined size. However, the invention is not limited to this configuration. Even when a single input member is arranged around the motor shaft or a plurality of input members are arranged at unequal intervals around the rotation axis of the motor shaft, that is, even when the first axis does not coincide with the fourth axis, it is possible to implement the invention as in the above-described embodiments by setting the size between the second axis and the third axis to a predetermined size (the size that is smaller than or equal to half of the size obtained by adding the diameter difference between the outside diameter of the bearing and the inside diameter of the input member, which defines the center hole, the diameter difference between the inside diameter of the bearing and the outside diameter of the eccentric portion and the operating clearance of the radial internal clearance of the bearing).

(6) In the above-described embodiments, the description is made on the example of the speed reduction mechanism in which the external gear is used as the external gear mechanism and the internal gear is used as the internal gear mechanism and the motor torque transmission device that includes the speed reduction mechanism. However, the invention is not limited to this configuration. For example, a disc-shaped curved plate having a plurality of wave-shaped portions formed of a trochoidal curve, such as epitrochoidal curve, at its outer peripheral portion may be used as the external gear mechanism, and a plurality of outer pins may be used as the internal gear mechanism. In this case, as a matter of course, the number of teeth of the external gear mechanism is the number of waves of the curved plate, and the number of teeth of the internal gear mechanism is the number of the outer pins. A speed reduction mechanism in which such a curved plate and outer pins are used, of course, includes a cycloid speed reducer.

According to the invention, it is possible to reduce cost and extend the life of each bearing.

What is claimed is:

1. A speed reduction mechanism, comprising:
   a rotary shaft that rotates around a first axis, and that has an eccentric portion of which a central axis is a second axis that is offset from the first axis;
   an input member that is arranged radially outward of the rotary shaft, and that is formed of an external gear mechanism having a center hole of which a central axis is a third axis and a plurality of through-holes arranged at equal intervals around the third axis and having a pitch circle of which a central axis coincides with the third axis, and provided with a bearing interposed between an inner periphery of the input member, which defines the center hole, and an outer periphery of the eccentric portion;
   a cylindrical housing that has a rotation force applying member formed of an internal gear mechanism that is arranged so as to be fitted to the input member in a radial direction of the input member, that is in mesh with the input member, that has teeth the number of which is larger than the number of teeth of the external gear mechanism, and that has a pitch circle of which a central axis is a fourth axis; and
   output members that receive rotation force applied to the input member by the rotation force applying member of the housing and output the rotation force, and that are passed through the respective through-holes, wherein
   when the bearing includes an outer ring and an inner ring and the outer ring is fitted to the inner periphery of the input member, which defines the center hole, with a clearance in a radial direction of the rotary shaft and the inner ring is fitted to the eccentric portion with a clearance in the radial direction of the rotary shaft,
   a size between the second axis and the third axis is set to a size that is smaller than or equal to half of a size obtained by adding a diameter difference between an outside diameter of the bearing and an inside diameter of the input member, which defines the center hole, a diameter difference between an inside diameter of the bearing and an outside diameter of the eccentric portion and an operating clearance of a radial internal clearance of the bearing in a state where the input member has been moved to contact the housing on a line perpendicular to the second axis and the fourth axis.

2. The speed reduction mechanism according to claim 1, wherein:
   the input member has an annular first protrusion of which a central axis coincides with the third axis; and
   the housing has an annular second protrusion that is fitted to the first protrusion and of which a central axis coincides with the fourth axis.

3. The speed reduction mechanism according to claim 2, wherein:
   a fitting face of the first protrusion of the input member is formed of an outer periphery of the first protrusion; and
   a fitting face of the second protrusion of the housing is formed of an inner periphery of the second protrusion.

4. The speed reduction mechanism according to claim 2, wherein:
   a fitting face of the first protrusion of the input member is formed of an inner periphery of the first protrusion; and
   a fitting face of the second protrusion of the housing is formed of an outer periphery of the second protrusion.

5. The speed reduction mechanism according to claim 3, wherein:
   the input member has the first protrusion that protrudes in a direction of the third axis; and
   the housing has the second protrusion that protrudes in a direction of the fourth axis.

6. The speed reduction mechanism according to claim 4, wherein:
   the input member has the first protrusion that protrudes in a direction of the third axis; and
   the housing has the second protrusion that protrudes in a direction of the fourth axis.

7. The speed reduction mechanism according to claim 3, wherein:
   the input member has the first protrusion that protrudes in a direction perpendicular to the third axis; and
   the housing has the second protrusion that protrudes in a direction perpendicular to the fourth axis.

8. A motor torque transmission device, comprising:
an electric motor that generates motor torque; and
a reduction-transmission mechanism that reduces a speed of rotation of the electric motor and transmits driving force to a driving force transmission target, wherein
the reduction-transmission mechanism is the speed reduction mechanism according to claim 1.

9. A motor torque transmission device, comprising:
an electric motor that generates motor torque; and
a reduction-transmission mechanism that reduces a speed of rotation of the electric motor and transmits driving force to a driving force transmission target, wherein
the reduction-transmission mechanism is the speed reduction mechanism according to claim 2.

10. A motor torque transmission device, comprising:
an electric motor that generates motor torque; and
a reduction-transmission mechanism that reduces a speed of rotation of the electric motor and transmits driving force to a driving force transmission target, wherein
the reduction-transmission mechanism is the speed reduction mechanism according to claim 3.

11. A motor torque transmission device, comprising:
an electric motor that generates motor torque; and
a reduction-transmission mechanism that reduces a speed of rotation of the electric motor and transmits driving force to a driving force transmission target, wherein
the reduction-transmission mechanism is the speed reduction mechanism according to claim 4.

12. A motor torque transmission device, comprising:
an electric motor that generates motor torque; and
a reduction-transmission mechanism that reduces a speed of rotation of the electric motor and transmits driving force to a driving force transmission target, wherein
the reduction-transmission mechanism is the speed reduction mechanism according to claim 5.

13. A motor torque transmission device, comprising:
an electric motor that generates motor torque; and
a reduction-transmission mechanism that reduces a speed of rotation of the electric motor and transmits driving force to a driving force transmission target, wherein
the reduction-transmission mechanism is the speed reduction mechanism according to claim 6.

14. A motor torque transmission device, comprising:
an electric motor that generates motor torque; and
a reduction-transmission mechanism that reduces a speed of rotation of the electric motor and transmits driving force to a driving force transmission target, wherein
the reduction-transmission mechanism is the speed reduction mechanism according to claim 7.

15. The motor torque transmission device according to claim 8, wherein the reduction-transmission mechanism transmits the driving force to a differential mechanism that serves as the driving force transmission target.

16. The motor torque transmission device according to claim 9, wherein the reduction-transmission mechanism transmits the driving force to a differential mechanism that serves as the driving force transmission target.

17. The motor torque transmission device according to claim 10, wherein the reduction-transmission mechanism transmits the driving force to a differential mechanism that serves as the driving force transmission target.

18. The motor torque transmission device according to claim 11, wherein the reduction-transmission mechanism transmits the driving force to a differential mechanism that serves as the driving force transmission target.

19. The motor torque transmission device according to claim 12, wherein the reduction-transmission mechanism transmits the driving force to a differential mechanism that serves as the driving force transmission target.

20. The motor torque transmission device according to claim 13, wherein the reduction-transmission mechanism transmits the driving force to a differential mechanism that serves as the driving force transmission target.

* * * * *